(12) United States Patent
Omori et al.

(10) Patent No.: US 7,515,170 B2
(45) Date of Patent: Apr. 7, 2009

(54) OPTICAL SCANNER AND IMAGE FORMING APPARATUS

(75) Inventors: Atsufumi Omori, Kanagawa (JP);
Masaaki Ishida, Kanagawa (JP);
Yasuhiro Nihei, Kanagawa (JP); Dan Ozasa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 197 days.

(21) Appl. No.: 11/512,122

(22) Filed: Aug. 30, 2006

(65) Prior Publication Data

US 2007/0091163 A1 Apr. 26, 2007

(30) Foreign Application Priority Data

Oct. 25, 2005 (JP) .............................. 2005-309248
Jul. 11, 2006 (JP) .............................. 2006-190031

(51) Int. Cl.
*B41J 2/435* (2006.01)
*B41J 2/47* (2006.01)

(52) U.S. Cl. ........................ 347/248; 347/229; 347/234

(58) Field of Classification Search ......... 347/233–234, 347/238, 248, 229, 249
See application file for complete search history.

(56) References Cited

U.S. PATENT DOCUMENTS

| | | | |
|---|---|---|---|
| 5,357,106 A | 10/1994 | Wilson | |
| 5,517,328 A * | 5/1996 | Wilson | ........................ 358/471 |
| 5,905,851 A | 5/1999 | Morimoto et al. | |
| 6,414,778 B1 | 7/2002 | Hori | |
| 6,906,739 B2 * | 6/2005 | Suzuki et al. | ................ 347/233 |
| 2003/0184639 A1 * | 10/2003 | Shimomura | .................. 347/132 |
| 2007/0091163 A1 | 4/2007 | Omori et al. | |

FOREIGN PATENT DOCUMENTS

| | | |
|---|---|---|
| JP | 2001-272615 | 10/2001 |
| JP | 2001-350111 | 12/2001 |
| JP | 2003-72135 | 3/2003 |

OTHER PUBLICATIONS

U.S. Appl. No. 11/471,640, filed Jun. 21, 2006, Ishida et al.
U.S. Appl. No. 11/512,122, filed Aug. 30, 2006, Omori et al.
U.S. Appl. No. 12/055,666, filed Mar. 26, 2008, Tanabe et al.
Robert L. Thornton, "Vertical Cavity Lasers and their Application to Laser Printing", SPIE, vol. 3003, XP-002385302, Apr. 1997, pp. 112-119.

* cited by examiner

*Primary Examiner*—Hai C Pham
(74) *Attorney, Agent, or Firm*—Oblon, Spivak, McClelland, Maier & Neustadt, P.C.

(57) ABSTRACT

An optical scanner includes a light source unit configured to emit light; an optical system configured to cause the light emitted from the light source unit to scan an object so as to form an image on the object; and a control unit configured to control the light source unit. The light source unit includes a plurality of light emitting units arranged in a sub scanning direction, and the control unit controls the light source unit to emit light at different positions on the object by using either n (n: positive integer) light emitting units or n+1 light emitting units selected from among the plurality of light emitting units, according to a positional shift amount of the image in the sub scanning direction.

15 Claims, 29 Drawing Sheets

| POSITION IN MAIN SCANNING DIRECTION | P1 | P2 | P3 | P4 | P5 | P6 |
|---|---|---|---|---|---|---|
| SUB POSITIONAL SHIFT AMOUNT | +L/2 | +3L/8 | +L/4 | +L/8 | 0 | −L/8 |
| SUB POSITIONAL SHIFT CORRECTION AMOUNT | −L/2 | −3L/8 | −L/4 | −L/8 | 0 | +L/8 |

| POSITION IN MAIN SCANNING DIRECTION | P7 | P8 | P9 | P10 | P11 |
|---|---|---|---|---|---|
| SUB POSITIONAL SHIFT AMOUNT | −L/4 | −L/8 | 0 | +L/8 | +L/4 |
| SUB POSITIONAL SHIFT CORRECTION AMOUNT | +L/4 | +L/8 | 0 | −L/8 | −L/4 |

FIG.6
| IMAGE DATA | LIGHT EMITTING TIMING |
|---|---|
| 0 | 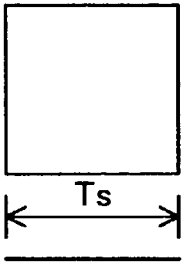 Ts |
| 1 | 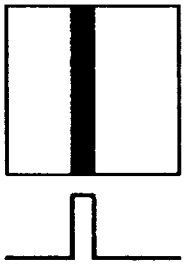 |
| 2 | 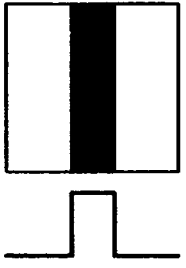 |
| 3 | 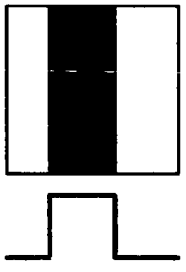 |
| 4 | 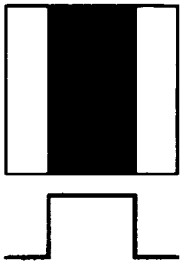 |
| IMAGE DATA | LIGHT EMITTING TIMING |
|---|---|
| 5 | 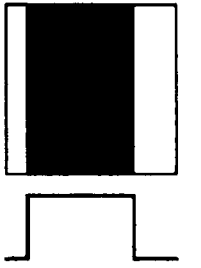 |
| 6 |  |
| 7 | 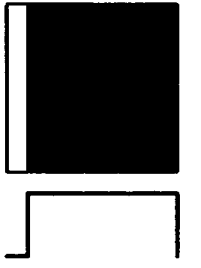 |
| 8 | 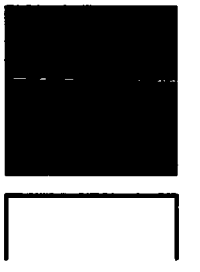 |

FIG.7

| LIGHT EMITTING PATTERN | M1 | M2 | M3 | M4 | M5 | M6 |
|---|---|---|---|---|---|---|
| B | | | | | | |
| C | Ts | | | | | |
| D | | | | | | |
| SUB POSITIONAL SHIFT AMOUNT | 0 | −L/32 | −2L/32 | −3L/32 | −4L/32 | −5L/32 |

| LIGHT EMITTING PATTERN | M7 | M8 | M9 | M10 | M11 | M12 |
|---|---|---|---|---|---|---|
| B | | | | | | |
| C | | | | | | |
| D | | | | | | |
| SUB POSITIONAL SHIFT AMOUNT | −6L/32 | −7L/32 | −8L/32 | L/32 | 2L/32 | 3L/32 |

| LIGHT EMITTING PATTERN | M13 | M14 | M15 | M16 | M17 |
|---|---|---|---|---|---|
| B | | | | | |
| C | | | | | |
| D | | | | | |
| SUB POSITIONAL SHIFT AMOUNT | 4L/32 | 5L/32 | 6L/32 | 7L/32 | 8L/32 |

LIGHT EMITTING PATTERN : M1

LIGHT EMITTING PATTERN : M2

LIGHT EMITTING PATTERN : M3

LIGHT EMITTING PATTERN : M4

LIGHT EMITTING PATTERN : M5

LIGHT EMITTING PATTERN : M6

LIGHT EMITTING PATTERN : M7

LIGHT EMITTING PATTERN : M8

LIGHT EMITTING PATTERN : M9

LIGHT EMITTING PATTERN : M10

LIGHT EMITTING PATTERN : M11

LIGHT EMITTING PATTERN : M12

LIGHT EMITTING PATTERN : M13

LIGHT EMITTING PATTERN : M14

LIGHT EMITTING PATTERN : M15

LIGHT EMITTING PATTERN : M16

LIGHT EMITTING PATTERN : M17

| POSITION IN MAIN SCANNING DIRECTION | P1 | P2 | P3 | P4 | P5 | P6 |
|---|---|---|---|---|---|---|
| SUB POSITIONAL SHIFT AMOUNT | +L/2 | +3L/8 | +L/4 | +L/8 | 0 | −L/8 |
| SUB POSITIONAL SHIFT CORRECTION AMOUNT | −L/2 | −3L/8 | −L/4 | −L/8 | 0 | +L/8 |

| POSITION IN MAIN SCANNING DIRECTION | P7 | P8 | P9 | P10 | P11 |
|---|---|---|---|---|---|
| SUB POSITIONAL SHIFT AMOUNT | −L/4 | −L/8 | 0 | +L/8 | +L/4 |
| SUB POSITIONAL SHIFT CORRECTION AMOUNT | +L/4 | +L/8 | 0 | −L/8 | −L/4 |

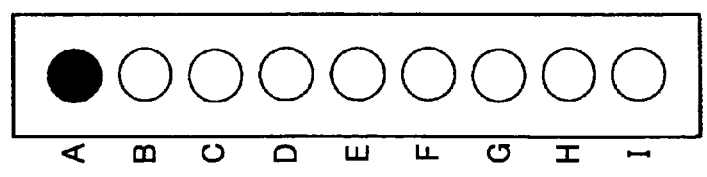
FIG.12F
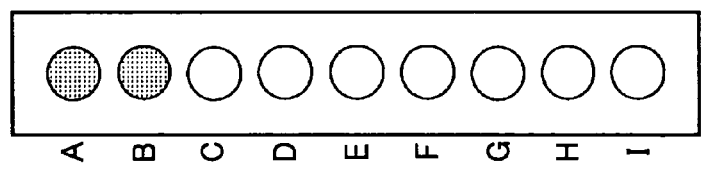
FIG.12E
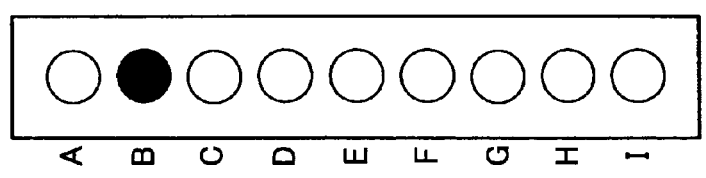
FIG.12D
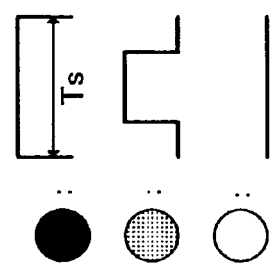
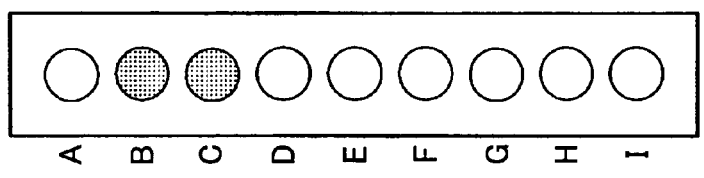
FIG.12C
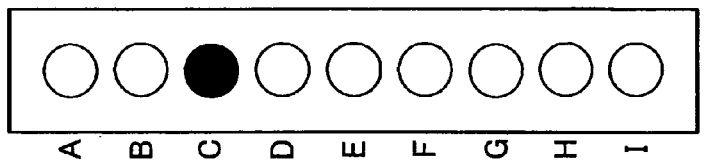
FIG.12B
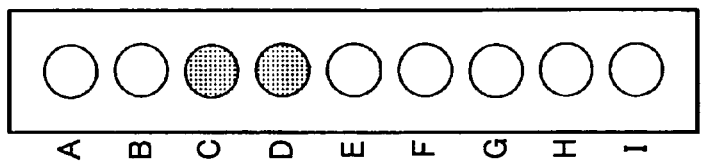
FIG.12A

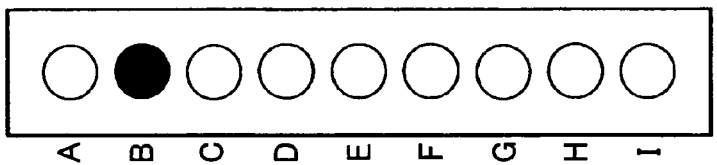
FIG.13E
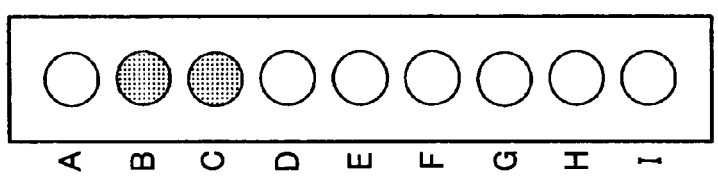
FIG.13D
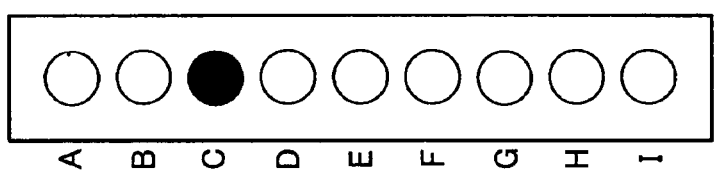
FIG.13C
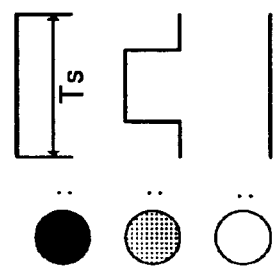
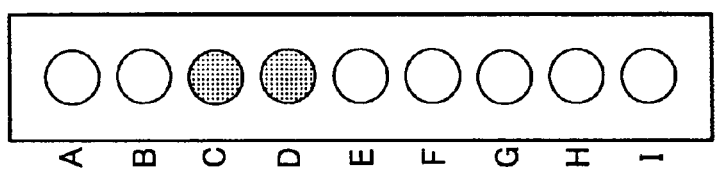
FIG.13B
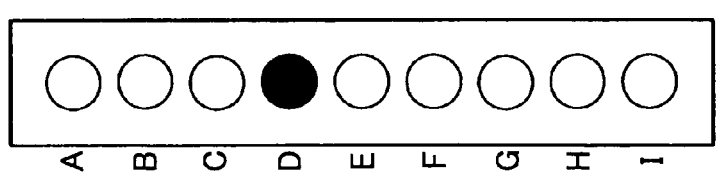
FIG.13A

FIG.16

| LIGHT EMITTING PATTERN | Q1 | Q2 | Q3 | Q4 | Q5 | Q6 |
|---|---|---|---|---|---|---|
| B | | | | | | |
| C | Ts | ⊓ | ⊓ | ⊓ | ⊓ | ⊓ |
| D | | | | | | |
| E | | ⊓ | ⊓ | ⊓ | ⊓ | ⊓ |
| SUB POSITIONAL SHIFT AMOUNT | 0 | −L/32 | −2L/32 | −3L/32 | −4L/32 | −5L/32 |

| LIGHT EMITTING PATTERN | Q7 | Q8 | Q9 | Q10 | Q11 | Q12 |
|---|---|---|---|---|---|---|
| B | | | | ⊓ | ⊓ | ⊓ |
| C | ⊓ | ⊓ | | | | |
| D | | | | ⊓ | ⊓ | ⊓ |
| E | ⊓ | ⊓ | | | | |
| SUB POSITIONAL SHIFT AMOUNT | −6L/32 | −7L/32 | −8L/32 | L/32 | 2L/32 | 3L/32 |

| LIGHT EMITTING PATTERN | Q13 | Q14 | Q15 | Q16 | Q17 |
|---|---|---|---|---|---|
| B | ⊓ | ⊓ | ⊓ | ⊓ | |
| C | | | | | |
| D | ⊓ | ⊓ | ⊓ | ⊓ | |
| E | | | | | |
| SUB POSITIONAL SHIFT AMOUNT | 4L/32 | 5L/32 | 6L/32 | 7L/32 | 8L/32 |

LIGHT EMITTING PATTERN :Q1

LIGHT EMITTING PATTERN : Q2

LIGHT EMITTING PATTERN : Q3

LIGHT EMITTING PATTERN : Q4

LIGHT EMITTING PATTERN : Q5

LIGHT EMITTING PATTERN : Q6

LIGHT EMITTING PATTERN :Q7

LIGHT EMITTING PATTERN : Q8

LIGHT EMITTING PATTERN : Q9

LIGHT EMITTING PATTERN : Q10

LIGHT EMITTING PATTERN : Q11

LIGHT EMITTING PATTERN : Q12

LIGHT EMITTING PATTERN : Q13

LIGHT EMITTING PATTERN : Q14

LIGHT EMITTING PATTERN : Q15

LIGHT EMITTING PATTERN : Q16

LIGHT EMITTING PATTERN : Q17

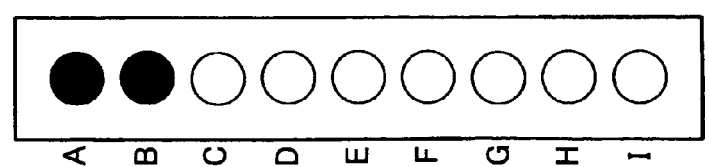
FIG.20A
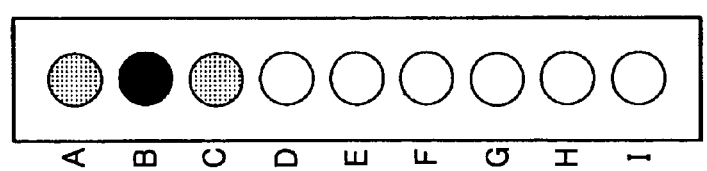
FIG.20B
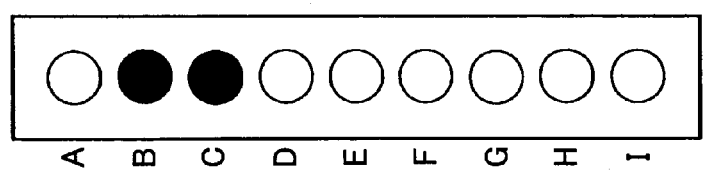
FIG.20C
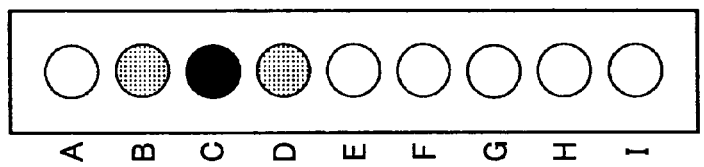
FIG.20D
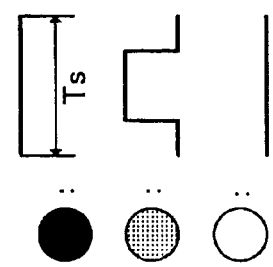
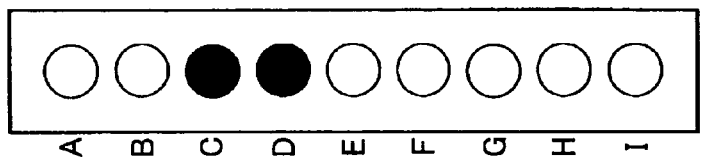
FIG.20E
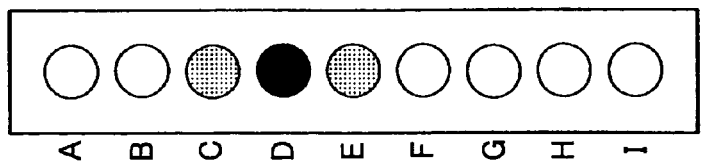
FIG.20F

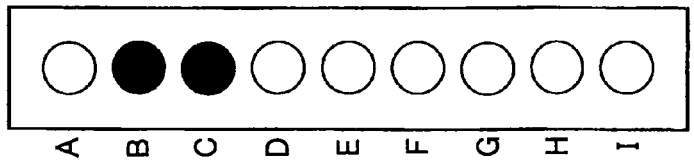
FIG.21E
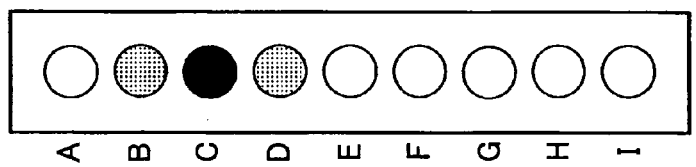
FIG.21D
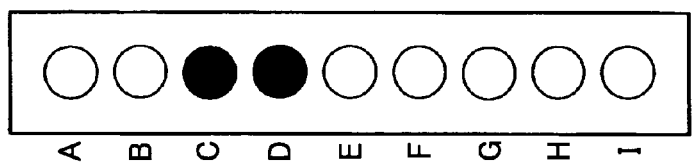
FIG.21C
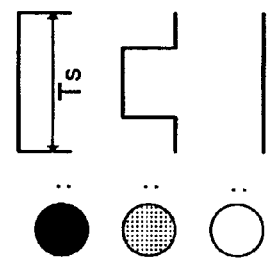
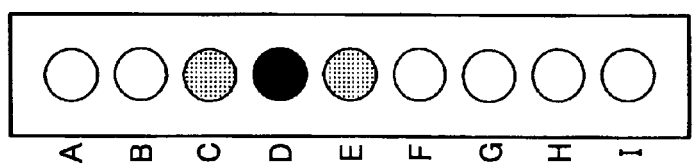
FIG.21B
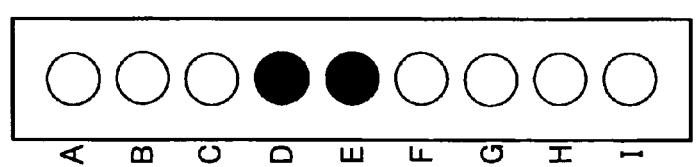
FIG.21A

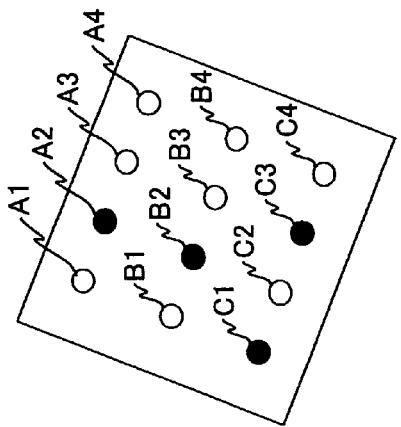
FIG.25B
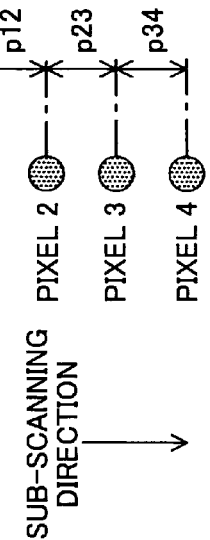
● : LIGHT EMITTING UNITS USED FOR SCANNING
p12=p23=p34
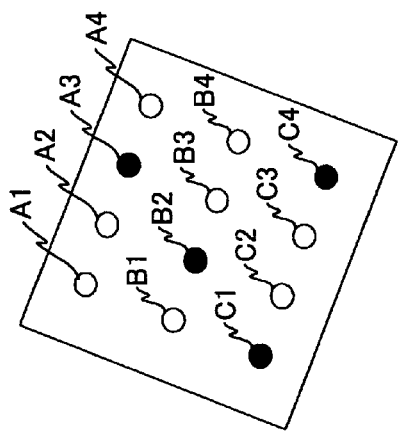
FIG.25A
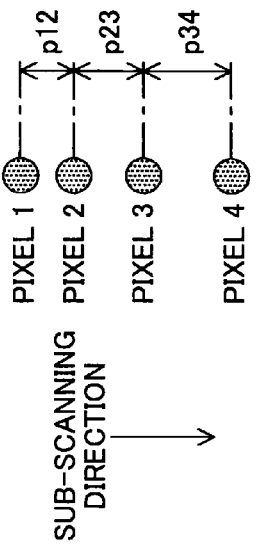
● : LIGHT EMITTING UNITS USED FOR SCANNING
p12<p23<p34

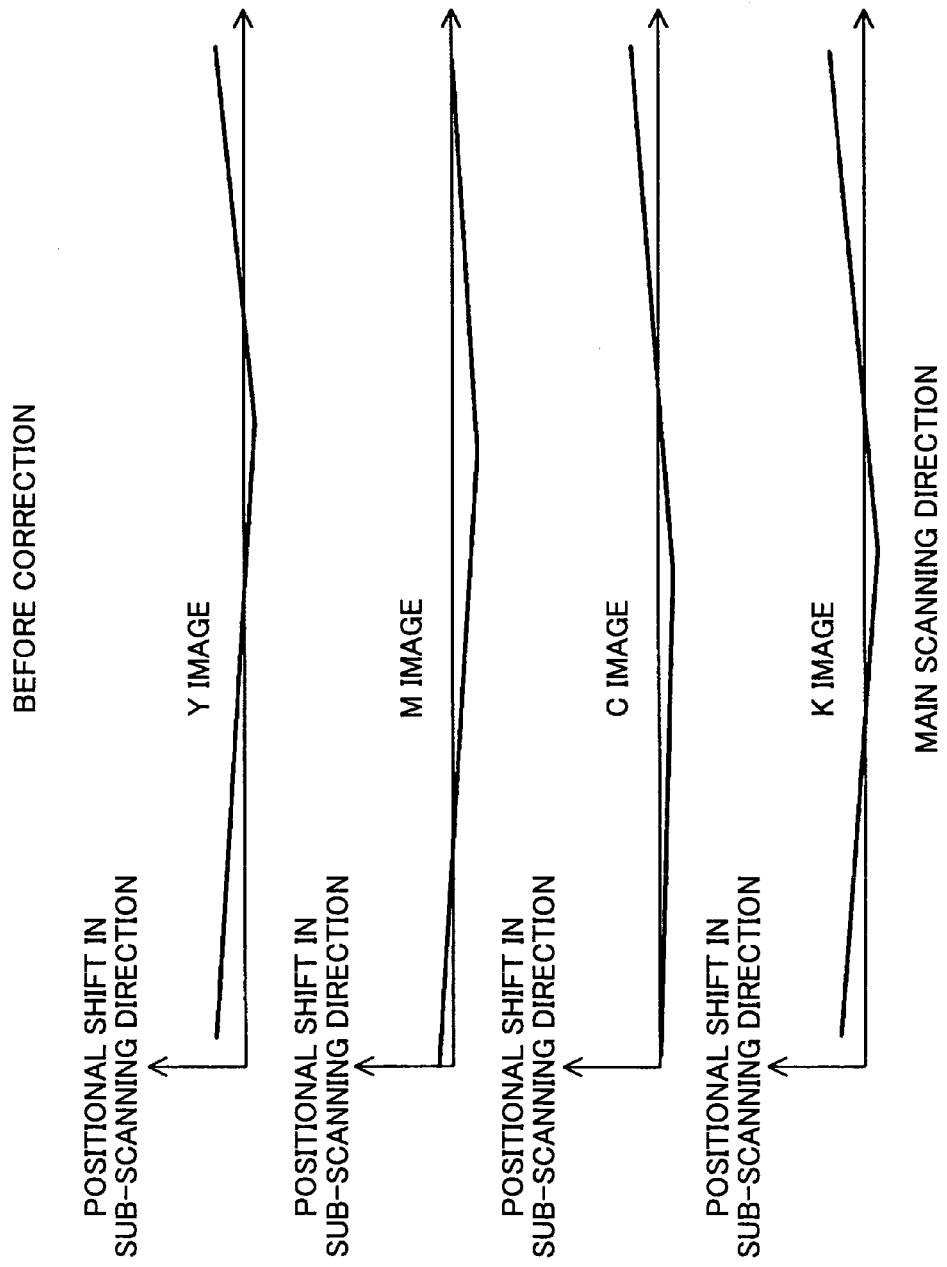

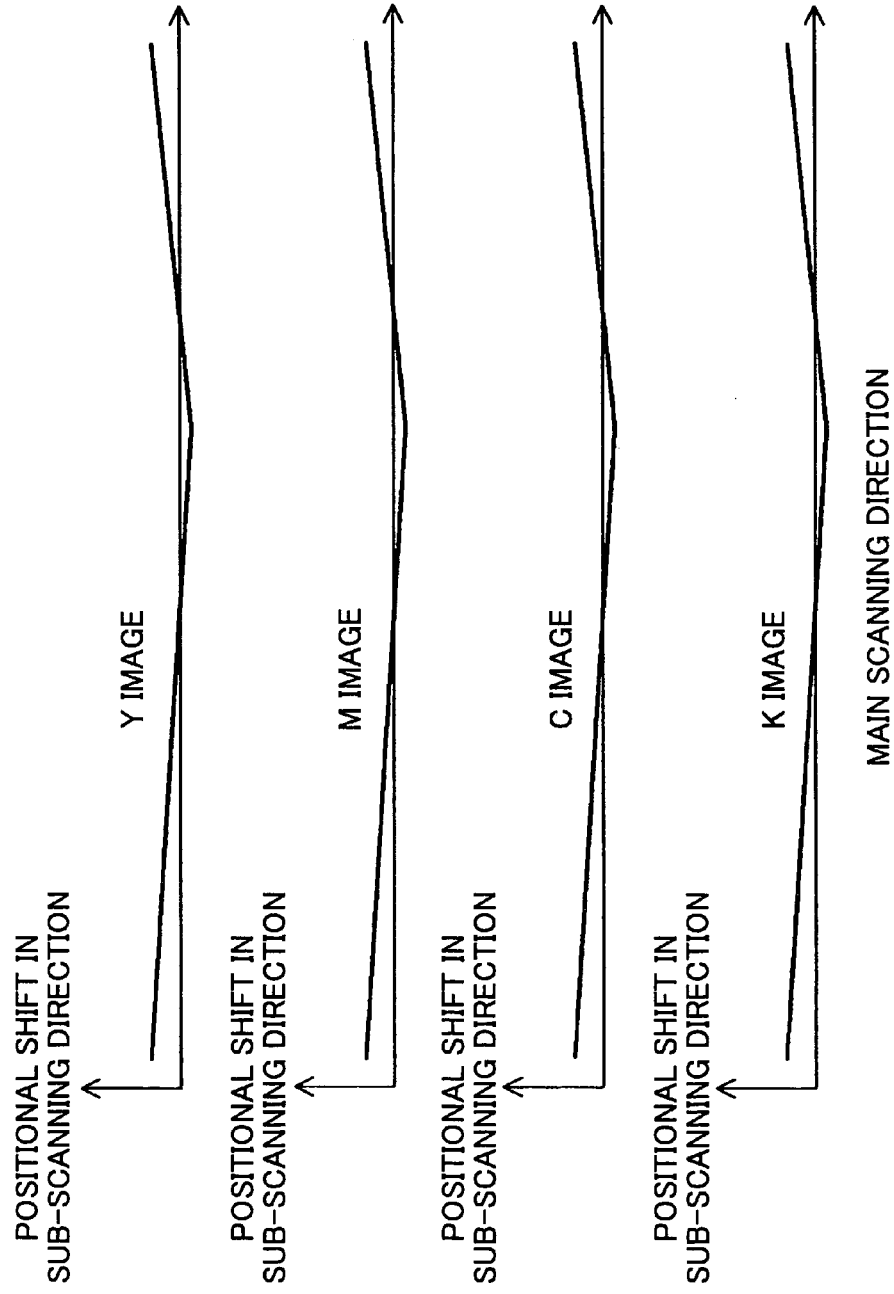

OPTICAL SCANNER AND IMAGE FORMING APPARATUS

BACKGROUND OF THE INVENTION

1. Field of the Invention

The present invention relates generally to optical scanners and image forming apparatuses, and more particularly to an optical scanner and an image forming apparatus for scanning a scan object with a light beam from a light source.

2. Description of the Related Art

In image forming apparatuses such as laser printers and digital copiers, a light beam emitted from a light source is modulated according to image information. The light beam passes through a polygon mirror and scan lenses, etc., and focuses on a photoconductor. The light beam scans the surface of the photoconductor in a predetermined direction (main scanning direction) to form a latent image (electrostatic latent image) on the photoconductor. Toner adheres to the latent image to visualize the image information.

In recent years, requirements for faster printing speed have been addressed by enhancing the rotational speed of the polygon mirror and frequencies of clock signals used for modulating light from the light source. However, the printing speed cannot be enhanced sufficiently by these methods. In an attempt to achieve even faster printing speed, a multi-beam method has been devised, which employs plural light sources (for example, see Patent Documents 1 through 3).

The light source employed in the multi-beam method is realized by, for example, a combination of laser chips that each emit a single beam, or an LD array or a vertical cavity surface emitting laser made by incorporating plural light emitting elements into a single laser chip.

These semiconductor lasers such as LD arrays employed in the multi-beam method are widely used as light sources in laser printers, etc., as they are extremely small, and can directly perform modulation at high speed by using a driving current. However, the relationship between the driving current and light output of semiconductor lasers changes with temperature, making it difficult to fix the light intensity of semiconductor lasers at a desired level. Particularly, in vertical cavity surface emitting lasers, light emitting elements are spaced apart by short intervals on a single chip; therefore, the temperature rapidly changes due to light emission and light quenching, and temperature crosstalk occurs significantly, causing variations in light quantity.

Moreover, in a multi-beam optical system including light sources with different oscillation wavelengths, exposure positions of each of the light sources are shifted from each other when color aberrations of scanning lenses are not corrected. As a result, light spots from different light sources are made to scan a medium by different scanning widths, resulting in deterioration in image quality. Accordingly, it is necessary to correct the scanning widths.

For example, in an optical scanner disclosed in Patent Document 1, plural light sources are disposed two-dimensionally, and plural light flux segments from the light sources are deflected by a deflecting unit to scan a medium. Intervals between light emitting points are minimized without causing heat crosstalk between the light emitting points.

Patent Document 2 discloses a method of controlling pixels of electrostatic latent images in an image forming apparatus that employs a vertical cavity surface emitting laser, by changing light emission intensity of each chip by pixel units, and controlling the light emitting time.

Patent Document 3 discloses a method of avoiding heat crosstalk and increasing the density of recorded images in an image forming apparatus employing a vertical cavity surface emitting laser, by prescribing the arrangement of light sources.

In scanning optical systems of image forming apparatuses, polygon mirrors may be tilted, or deflecting reflection surfaces may be disposed at uneven distances from a rotational axis. As a result, light spots (scanning beams) are caused to scan a photoconductor at inconsistent positions and speeds. This leads to fluctuations in the images, which deteriorates image quality.

Over the years, even higher levels of image quality are being demanded. The technologies disclosed in Patent Documents 1 through 3 incur high costs, and are insufficient for achieving the high image quality being demanded.

Patent Document 1: Japanese Laid-Open Patent Application No. 2001-272615

Patent Document 2: Japanese Laid-Open Patent Application No. 2003-72135

Patent Document 3: Japanese Laid-Open Patent Application No. 2001-350111

SUMMARY OF THE INVENTION

The present invention provides an optical scanner and an image forming apparatus in which one or more of the above-described disadvantages is eliminated.

A preferred embodiment of the present invention provides an optical scanner that can precisely correct a sub scanning direction positional shift of an image a without incurring high costs.

A preferred embodiment of the present invention provides an image forming apparatus that can form high-quality images without incurring high costs.

An embodiment of the present invention provides an optical scanner, including: a light source unit configured to emit light; an optical system configured to cause the light emitted from the light source unit to scan an object so as to form an image on the object; and a control unit configured to control the light source unit; wherein the light source unit includes a plurality of light emitting units arranged in a sub scanning direction, and the control unit controls the light source unit to emit light at different positions on the object by using n (n: positive integer) light emitting units or n+1 light emitting units selected from among the plurality of light emitting units, according to a positional shift amount of the image in the sub scanning direction.

An embodiment of the present invention provides in combination, a light source unit and a control unit for use with an optical system configured to cause light emitted from the light source unit to scan an object so as to form an image on the object, the combination including: a light source unit configured to emit light; and a control unit configured to control the light source unit; wherein the light source unit includes a plurality of light emitting units arranged in a sub scanning direction, and the control unit controls the light source unit to emit light at different positions on the object by using n (n: positive integer) light emitting units or n+1 light emitting units selected from among the plurality of light emitting units, according to a positional shift amount of the image in the sub scanning direction.

According to one embodiment of the present invention, an optical scanner can precisely correct a sub scanning direction positional shift of an image without incurring high costs.

According to one embodiment of the present invention, an image forming apparatus can form high-quality images without incurring high costs.

BRIEF DESCRIPTION OF THE DRAWINGS

Other objects, features and advantages of the present invention will become more apparent from the following detailed description when read in conjunction with the accompanying drawings, in which:

FIG. 6 provides a table showing relationships between image data and light emitting timings;

FIG. 7 provides a table showing light emitting patterns;

FIGS. 12A through 12F are schematic diagrams of light emitting units selected as light sources for correcting the sub scanning direction positional shifts shown in FIGS. 11A, 11B (part 1);

FIGS. 13A through 13E are schematic diagrams of light emitting units selected as light sources for correcting the sub scanning direction positional shifts shown in FIGS. 11A, 11B (part 2);

FIG. 16 provides a table showing light emitting patterns when two default light sources are designated for each scanning line as shown in FIG. 15;

FIGS. 20A through 20F are schematic diagrams of light emitting units selected as light sources for correcting sub scanning direction positional shifts shown in FIGS. 11A, 11B when two default light sources are designated for each scanning line (part 1);

FIGS. 21A through 21E are schematic diagrams of light emitting units selected as light sources for correcting sub scanning direction positional shifts shown in FIGS. 11A, 11B when two default light sources are designated for each scanning line (part 2);

FIGS. 25A, 25B are schematic diagrams for describing selection of light sources for scanning when using the semiconductor laser shown in FIG. 24;

FIGS. 27A, 27B describe how positional shifts are corrected in the sub scanning direction for each color image.

DETAILED DESCRIPTION OF THE PREFERRED EMBODIMENTS

A description is given, with reference to the accompanying drawings, of an embodiment of the present invention.

Figure 1:
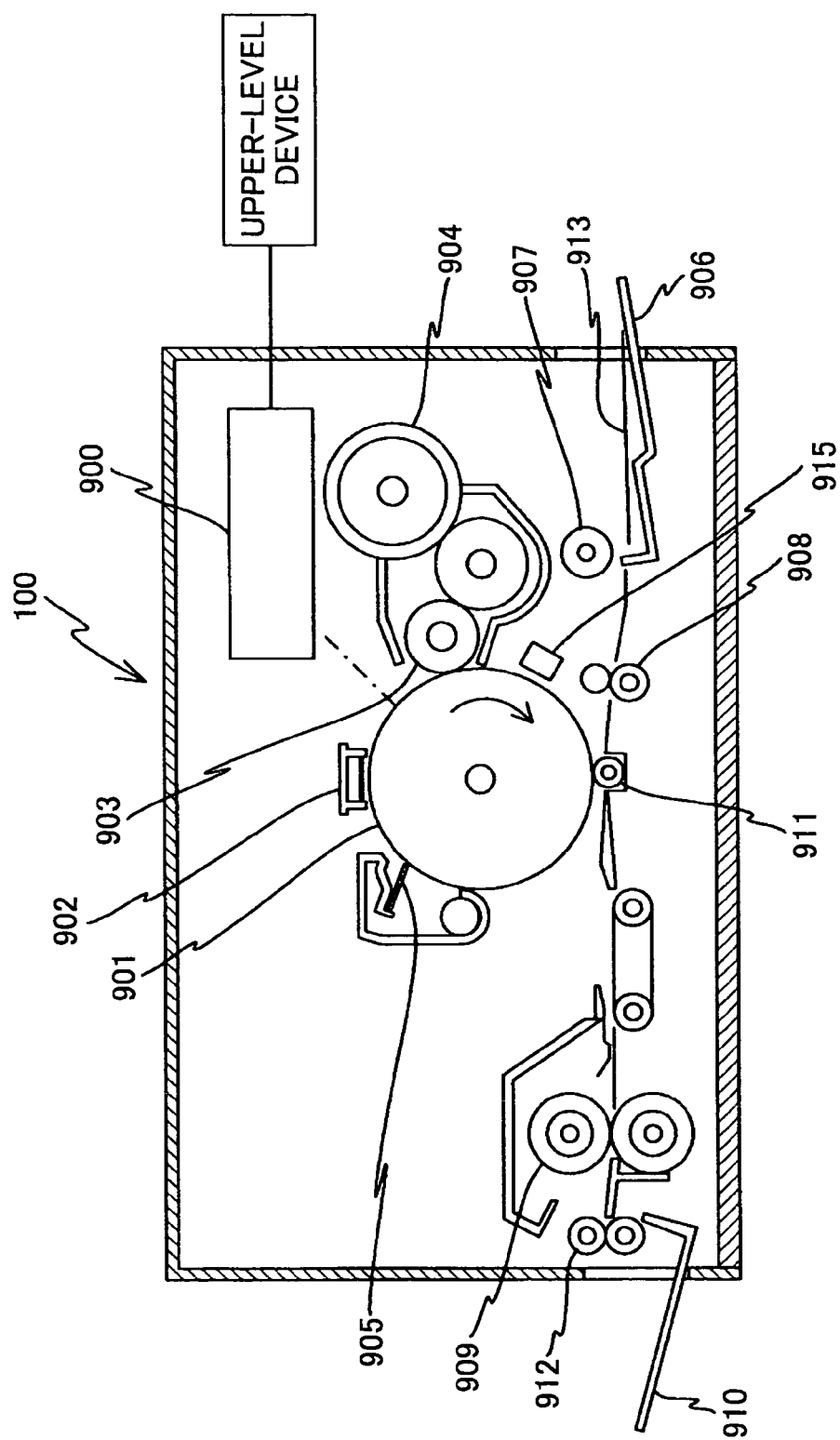
FIG. 1 is a schematic diagram of a laser printer according to an embodiment of the present invention.

FIG. 1 is a schematic diagram of a laser printer 100 serving as an image forming apparatus according to an embodiment of the present invention.

The laser printer 100 shown in FIG. 1 includes an optical scanner 900, a photoconductive drum 901 that is an object of scanning, an electrostatic charger 902, a developing roller 903, a toner cartridge 904, a cleaning blade 905, a paper feeding tray 906, a paper feeding roller 907, a pair of registration rollers 908, a transfer charger 911, a pair of fixing rollers 909, a pair of paper discharge rollers 912, a paper discharge tray 910, and a positional shift sensor 915.

The electrostatic charger 902, the developing roller 903, the transfer charger 911, and the cleaning blade 905 are disposed near the surface of the photoconductive drum 901. They are disposed in the following order in a rotational direction of the photoconductive drum 901: the electrostatic charger 902→the developing roller 903 the transfer charger 911→the cleaning blade 905.

The surface of the photoconductive drum 901 is covered by a photoconductive layer. The photoconductive drum 901 is rotated in a clockwise direction (direction indicated by arrow) as viewed in FIG. 1.

The electrostatic charger 902 uniformly charges the surface of the photoconductive drum 901.

The optical scanner 900 emits a light beam onto the surface of the photoconductive drum 901, which is charged by the electrostatic charger 902. The light beam is modulated based on image information from an upper-level device (for example, a personal computer). Accordingly, electric charges disappear from the parts where the photoconductive drum 901 is emitted by the light beam, so that a latent image corresponding to the image information is formed on the surface of the photoconductive drum 901. The formed latent image moves toward the developing roller 903 as the photoconductive drum 901 rotates. The longitudinal direction (direction along rotational axis) of the photoconductive drum 901 is referred to as a "main scanning direction", and the direction of rotation of the photoconductive drum 901 is referred to as a "sub scanning direction". The configuration of the optical scanner 900 will be described later.

Toner is stored in the toner cartridge 904, and the toner is supplied to the developing roller 903. The amount of toner stored in the toner cartridge 904 is checked when power of the laser printer 100 is turned on and when printing is completed. When the amount of toner remaining is small, a not shown display unit displays a message to prompt the user to replace the toner cartridge 904 with a new one.

As the developing roller 903 rotates, the surface of the developing roller 903 becomes uniformly covered with a thin layer of charged toner supplied from the toner cartridge 904. Voltage is applied to the developing roller 903 so that electric fields formed in charged parts (parts not emitted with light) and non-charged parts (parts emitted with light) are in opposite directions to each other. The voltage causes toner adhering to the surface of the developing roller 903 to adhere only to the parts emitted with light on the surface of the photoconductive drum 901. In other words, the developing roller 903 makes the toner adhere to the latent image formed on the surface of the photoconductive drum 901, so as to visualize the image information. The latent image with toner adhering thereto moves toward the transfer charger 911, as the photoconductive drum 901 rotates.

Recording sheets 913, onto which the image is to be transferred, are stored in the paper feeding tray 906. The paper feeding roller 907 is disposed near the paper feeding tray 906. The paper feeding roller 907 retrieves one recording sheet 913 at a time from the paper feeding tray 906, and conveys the recording sheet 913 to the pair of registration rollers 908. The pair of registration rollers 908 is disposed near the transfer charger 911, and temporarily holds the recording sheet 913. In association with rotation of the photoconductive drum 901, the pair of registration rollers 908 sends out the recording sheet 913 in between the photoconductive drum 901 and the transfer charger 911.

In order to electrically attract toner from the surface of the photoconductive drum 901 to the recording sheet 913, the transfer charger 911 is applied with a voltage of a polarity opposite to that of the toner. This voltage causes the latent image on the surface of the photoconductive drum 901 to be transferred onto the recording sheet 913. The recording sheet 913 onto which the image is transferred is then conveyed to the fixing rollers 909.

The fixing rollers 909 apply heat and pressure to the recording sheet 913, thereby fixing the toner onto the recording sheet 913. The recording sheet 913 onto which the toner is fixed is then conveyed to the paper discharge tray 910 via the paper discharge rollers 912. The recording sheets 913 are sequentially stacked onto the paper discharge tray 910.

The cleaning blade 905 removes toner (residual toner) remaining on the surface of the photoconductive drum 901. The removed residual toner is recycled. The surface of the photoconductive drum 901 from which the residual toner is removed returns to its original position, opposite the electrostatic charger 902.

The positional shift sensor 915 is disposed near the photoconductive drum 901, and detects the position of an image formed on the photoconductive drum 901, and outputs signals including positional shift information.

Figure 2:
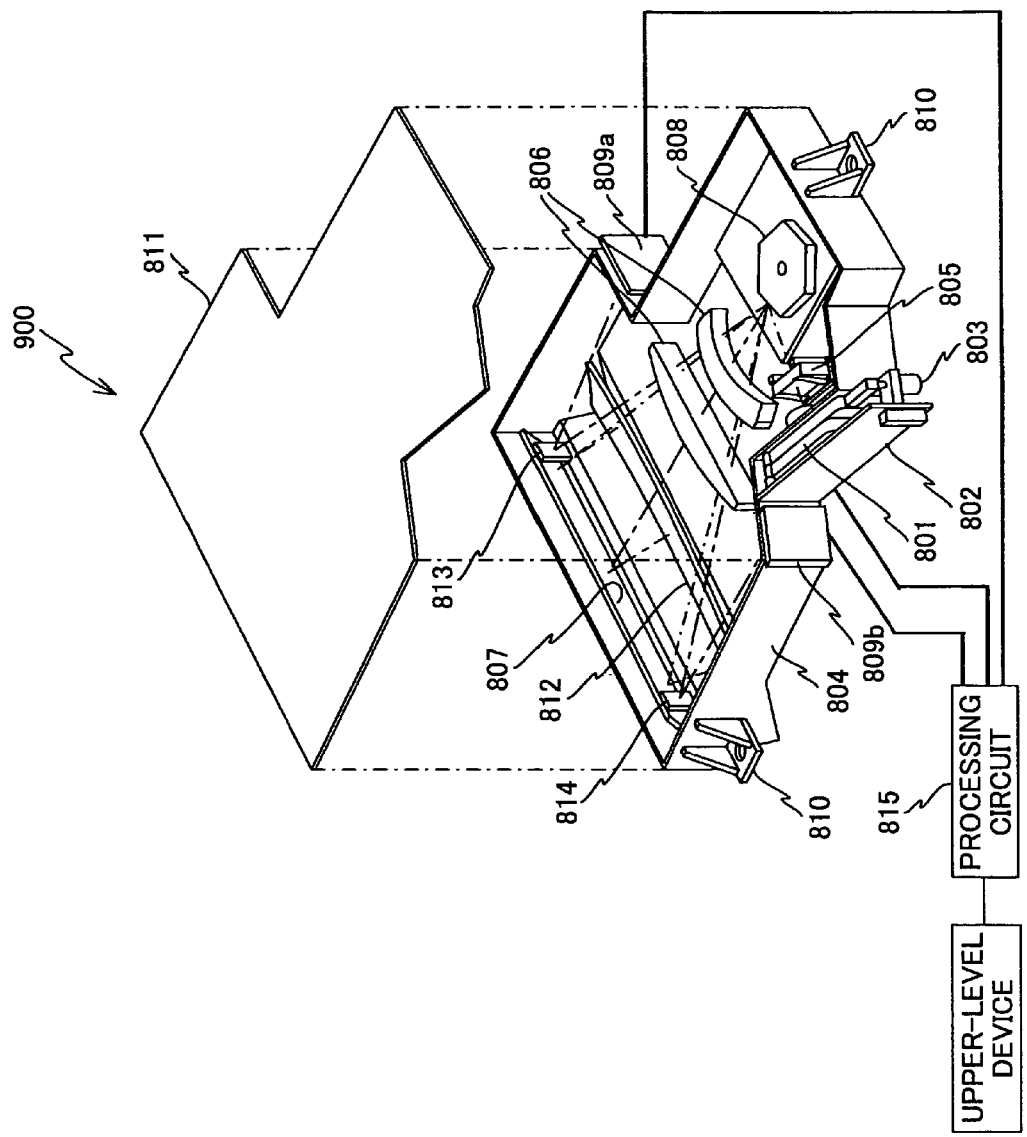
FIG. 2 is a perspective view (part 1) of an optical scanner shown in FIG. 1.
Figure 3:
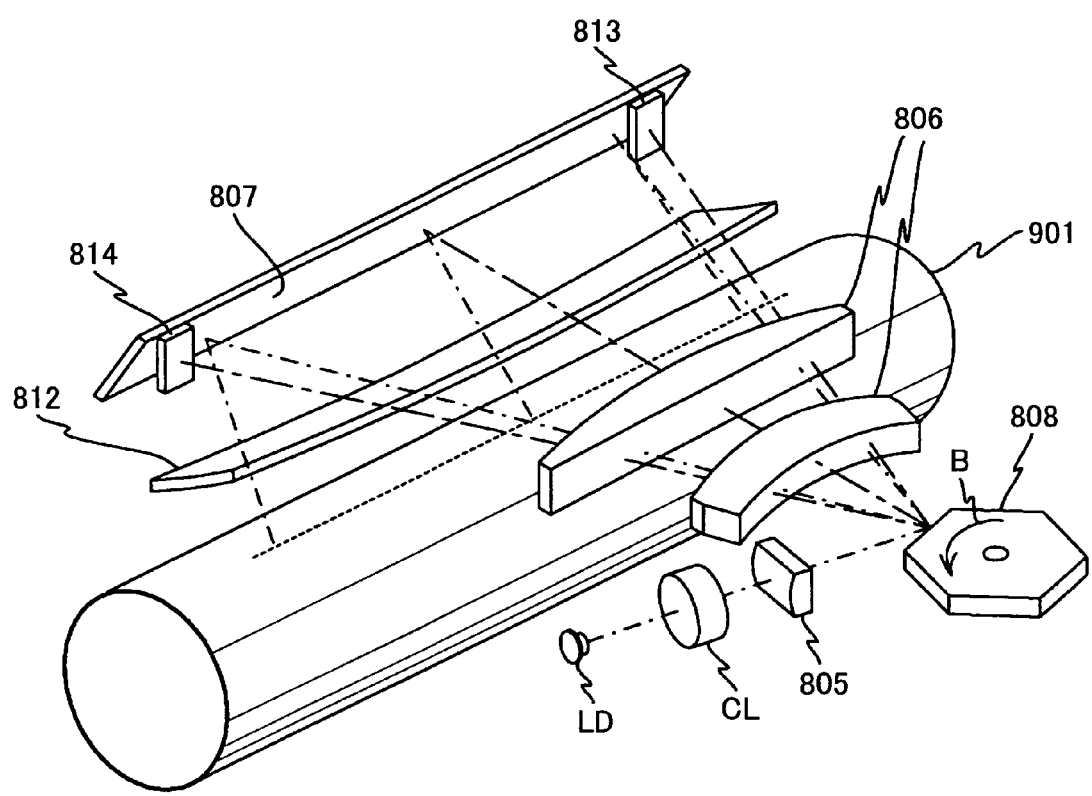
FIG. 3 is a perspective view (part 2) of the optical scanner shown in FIG. 1.

FIGS. 2 and 3 are perspective views of the optical scanner 900.

The optical scanner 900 includes a light source unit 801, a collimate lens CL, a cylinder lens 805, a polygon mirror 808, a not shown polygon motor that rotates the polygon mirror 808, an fθ lens 806, a turn-back mirror 807, a toroidal lens 812, two reflection mirrors (813, 814), a print substrate 802, two PD substrates (809a, 809b), and a processing circuit 815. An optical system including the collimate lens CL, the cylinder lens 805, the polygon mirror 808, the fθ lens 806, the turn-back mirror 807, and the toroidal lens 812, which are disposed along a light beam path between the light source unit 801 and the photoconductive drum 901, are referred to as a "scanning optical system" in this specification.

The light source unit 801 includes a semiconductor laser LD that emits a laser beam, modulated according to image information, toward the polygon mirror 808. As shown in an example of FIG. 4, the semiconductor laser LD includes nine light emitting units having substantially the same light emitting properties. Each light emitting unit is formed on the same substrate (chip).

Figure 4:
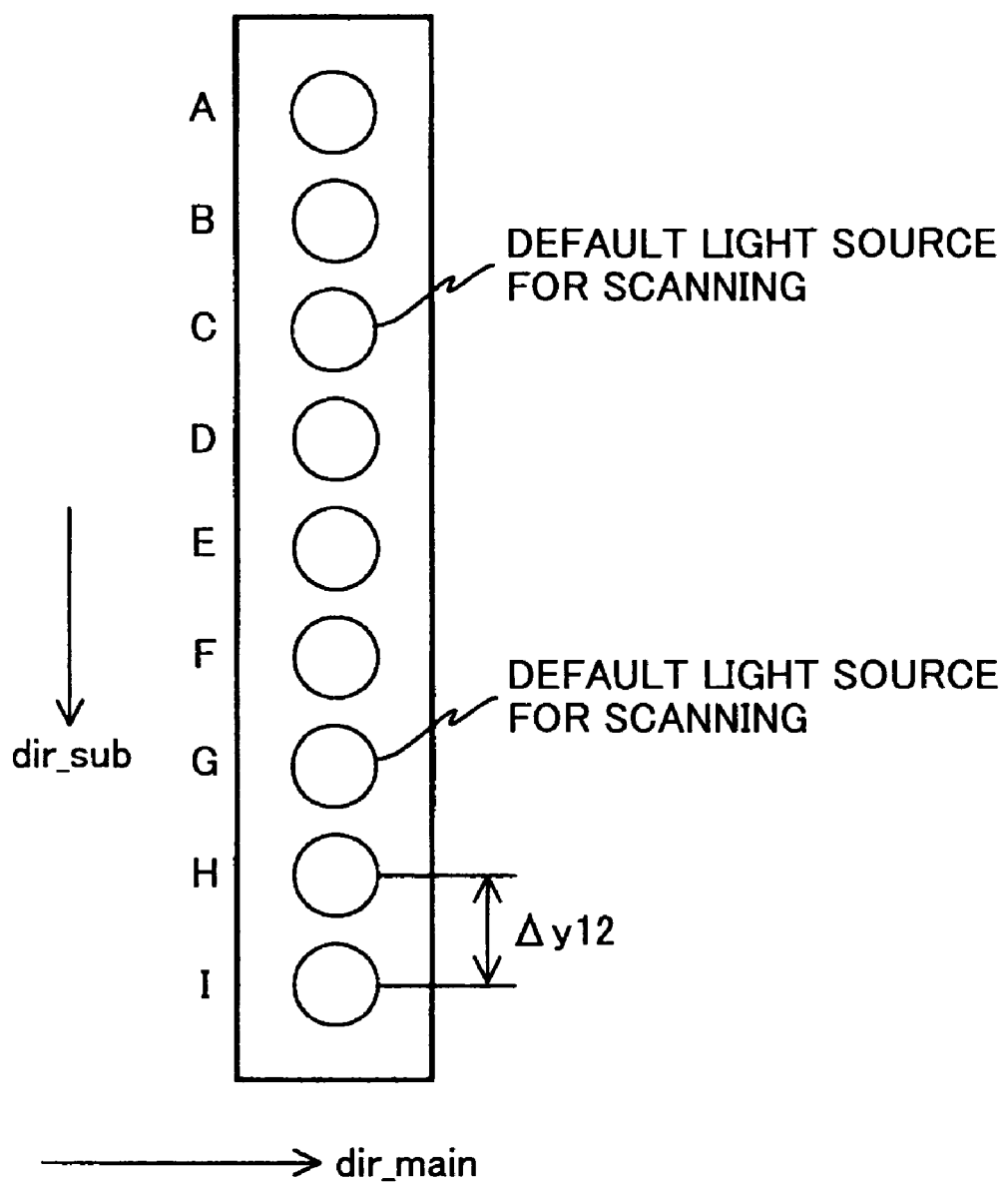
FIG. 4 is a schematic diagram of a semiconductor laser shown in FIG. 3.

The nine light emitting units are arranged in a row and equally spaced apart in a direction corresponding to the sub scanning direction (referred to as "dir_sub direction" in this specification as a matter of convenience) that is orthogonal to a direction corresponding to the main scanning direction (referred to as "dir_main direction" in this specification as a matter of convenience). A direction from the left to the right as viewed in FIG. 4 is referred to as a +direction of the dir_main direction (+dir_main direction). A direction from the top to the bottom as viewed in FIG. 4 is referred to as a +direction of the dir_sub direction (+dir_sub direction). A light emitting unit A, a light emitting unit B, a light emitting unit C, a light emitting unit D, a light emitting unit E, a light emitting unit F, a light emitting unit G, a light emitting unit H, and a light emitting unit I are disposed in this order in the +dir_sub direction. An interval between adjacent light emitting units is $\Delta y12$.

For example, two scanning lines (line 1, line 2) are simultaneously used for scanning. As shown in FIG. 4, the light emitting unit C is designated as the default light source used for scanning with line 1, and the light emitting unit G is designated as the default light source used for scanning with line 2.

Positions of latent images formed on the surface of the photoconductive drum 901 are sometimes shifted due to scanning irregularities caused by properties of the fθ lens 806, plane tilting of deflecting reflection surfaces of the polygon mirror 808, unequal distances between the deflecting reflection surfaces and the rotational axis, irregular rotations of the polygon mirror 808, and/or variations in wavelengths of the laser beam emitted from the semiconductor laser LD. A positional shift in the main scanning direction is also referred to as a "main scanning direction positional shift", and a positional shift in the sub scanning direction is also referred to as a "sub scanning direction positional shift" in this specification, as a matter of convenience.

Referring back to FIG. 2, the print substrate 802 is attached to the backside of the light source unit 801, which is pressed against the wall of an optical housing 804 by a spring. It is possible to adjust the position of the light source unit 801 with respect to the wall of the optical housing 804, with an adjusting screw 803. Accordingly, the direction of a light beam emitted from the light source unit 801 can be adjusted. The adjusting screw 803 is screwed to a projection formed on the wall of the optical housing 804. As shown in FIG. 3, the collimate lens CL, the cylinder lens 805, the polygon mirror 808, the polygon motor (not shown), the fθ lens 806, the turn-back mirror 807, the toroidal lens 812, and the two reflection mirrors (813, 814), are supported inside the optical housing 804 at predetermined positions. Similar to the light source unit 801, the PD substrates (809a, 809b) are attached to the outside of the optical housing 804. A cover 811 seals the top of the optical housing 804, and the optical housing 804 is fixed to a frame member of the laser printer 100 with screws at plural attaching parts 810, protruding from the wall of the optical housing 804.

The collimate lens CL makes light beams from the light source unit 801 substantially parallel. The cylinder lens 805 straightens light beams from the collimate lens CL.

Operations of the scanning optical system are briefly described. A light beam from the light source unit 801 passes through the collimate lens CL and the cylinder lens 805, and focuses at or around a deflecting surface of the polygon mirror 808. The polygon mirror 808 is rotated at a constant speed by the polygon motor (not shown) in a direction indicated by an arrow B shown in FIG. 3. Light beams focused at or around the deflecting surface are deflected at equal angular speeds as the polygon mirror 808 rotates. A light beam deflected by the polygon mirror 808 passes through the fθ lens 806, onto the turn-back mirror 807. The light beam reflects from the turn-back mirror 807, passes through the toroidal lens 812, and scans the surface of the photoconductive drum 901 in the main scanning direction. A scanning operation from a scan starting position to a scan ending position in the main scanning direction is referred to one "unit scanning" in this specification, as a matter of convenience.

One of the two reflection mirrors (813, 814) is provided on each side of the turn-back mirror 807 in the main scanning direction. A light beam reflected by the reflection mirror 813 is received by a light receiving element (PD1) mounted on the PD substrate 809*a*, and a light beam reflected by the reflection mirror 814 is received by a light receiving element (PD2) mounted on the PD substrate 809*b*. The light receiving elements are disposed at equal distances from the image surface. In this example, the reflection mirrors (813, 814) are disposed such that a light beam deflected by the polygon mirror 808 enters the light receiving element PD1 before a unit scanning, and enters the light receiving element PD2 after the unit scanning. The light receiving elements output signals corresponding to the light quantity received (photoelectric conversion signal).

Figure 5:
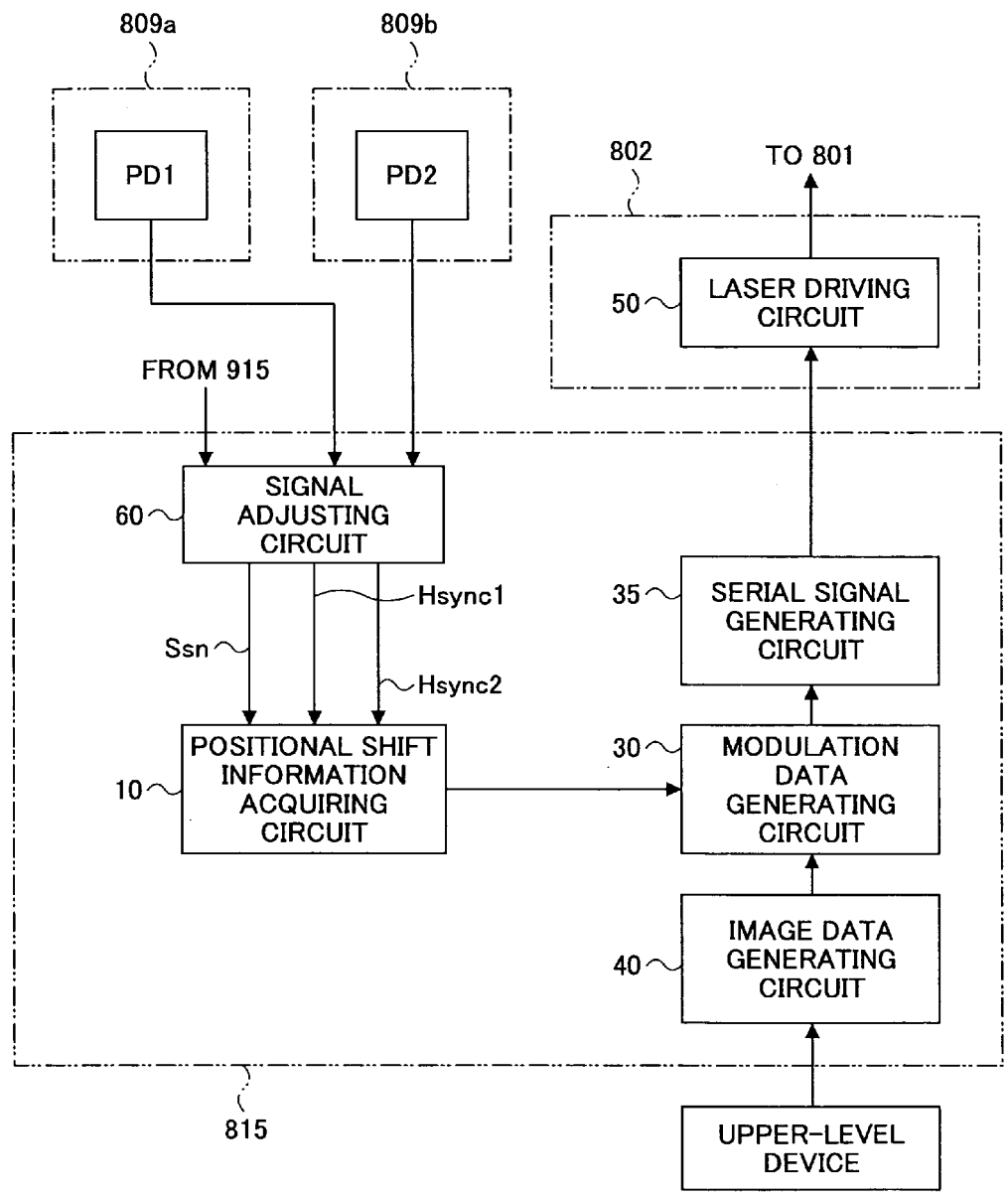
FIG. 5 is a block diagram of various circuits mounted on print substrates shown in FIG. 2.

As shown in FIG. 5, a laser driving circuit 50 is mounted on the print substrate 802. The laser driving circuit 50 generates driving signals for driving the light emitting units based on serial signals from the processing circuit 815, which will be described later. The generated driving signals are output to the light source unit 801. The light source unit 801 supplies the driving signals to the semiconductor laser LD.

As shown in FIG. 5, the processing circuit 815 includes a signal adjusting circuit 60, a positional shift information acquiring circuit 10, a modulation data generating circuit 30, a serial signal generating circuit 35, and an image data generating circuit 40.

The signal adjusting circuit 60 amplifies, inverts, and binarizes an output signal from the light receiving element PD1 to generate a signal Hsync1, and amplifies, inverts, and binarizes an output signal from the light receiving element PD2 to generate a signal Hsync2. When a light beam enters the light receiving element PD1, the signal Hsync1 changes from "H (high level)" to "L (low level)", and when a light beam enters the light receiving element PD2, the signal Hsync2 changes from "H" to "L". Further, the signal adjusting circuit 60 amplifies and binarizes an output signal from the positional shift sensor 915 to generate a signal Ssn.

The positional shift information acquiring circuit 10 acquires a positional shift amount in the sub scanning direction (also referred to as "sub positional shift amount" in this specification as a matter of convenience), based on the signal Ssn generated from a scanning operation performed for acquiring positional shift information before performing the actual scanning operation according to image information. When the sub positional shift amount is 0, the distance (interval) between adjacent scanning lines in the sub scanning direction is L.

When performing the actual scanning, the positional shift information acquiring circuit 10 generates correction information signals including correction information for correcting a sub scanning direction positional shift, based on the acquired sub positional shift amount. The correction information signals are output to the modulation data generating circuit 30.

The image data generating circuit 40 generates image data based on image information from the upper-level device.

The modulation data generating circuit 30 selects the light source to be used for scanning (e.g., from among the light emitting units shown in FIG. 4) based on the correction information signals received from the positional shift information acquiring circuit 10, and generates modulation data for controlling driving of the light source to be used for scanning based on the image data received from the image data generating circuit 40.

The serial signal generating circuit 35 converts the modulation data received from the modulation data generating circuit 30 into serial signals, and outputs the serial signals to the laser driving circuit 50. The serial signal generating circuit 35 can be, for example, a positional shift register.

FIG. 6 provides a table showing relationships between image data and light emitting timings according to an embodiment of the invention. As shown in FIG. 6, the light emitting time of each light emitting unit can be controlled by a pulse width that is one-eighth of a time width (Ts) corresponding to one pixel.

When one light emitting unit or two adjacent light emitting units are used as the light source(s) for scanning based on correction information signals, one of 17 types of light emitting patterns (M1 through M17) shown in an example in FIG. 7 is selected by the modulation data generating circuit 30. The following is a description for a specific example, in which a sub scanning direction positional shift is corrected when the sub positional shift amount is smaller than (¼)×L for line 1.

Figure 8A:
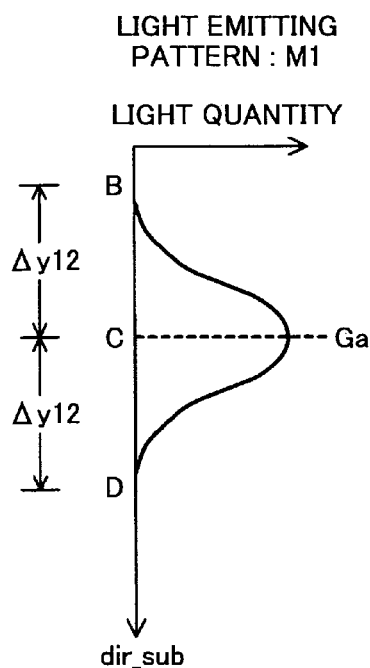
FIGS. 8A through 8F provide graphs (part 1) for describing the light emitting patterns shown in FIG. 7.

Light emitting pattern M1 is applied when the sub positional shift amount is 0. Specifically, the light emitting unit C emits light by a regular pulse width Ts, and neither the light emitting unit B nor the light emitting unit D emits light. The centroid of the light beam is denoted by a reference numeral Ga in FIG. 8A, which substantially matches the light emitting point of the light emitting unit C. In this case, the centroid of a light spot focused onto the photoconductive drum 901 is positioned on a target scanning line, where the sub positional shift amount is substantially 0.

Figure 8B:
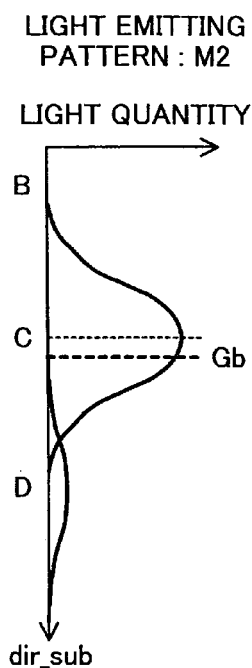

Light emitting pattern M2 is applied when the sub positional shift amount is −(1/32)×L. Specifically, the light emitting unit C emits light by a pulse width of (⅞)Ts, the light emitting unit D emits light by a pulse width of (⅛)Ts, and the light emitting unit B does not emit light. The centroid of the light beam is denoted by a reference numeral Gb in FIG. 8B, which is shifted positively in a dir_sub direction by (⅛)× Δy12 with respect to Ga. Accordingly, the centroid of a light spot focused onto the photoconductive drum 901 is positioned on a target scanning line.

Figure 8C:
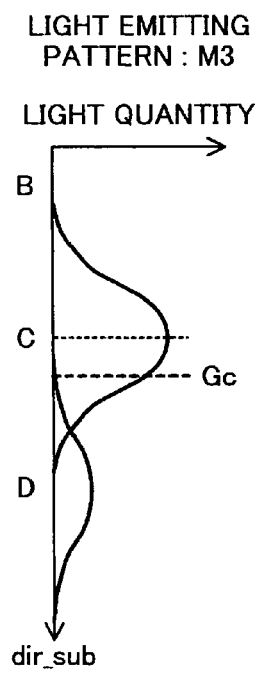

Light emitting pattern M3 is applied when the sub positional shift amount is −(2/32)×L. Specifically, the light emitting unit C emits light by a pulse width of (6/8)Ts, the light emitting unit D emits light by a pulse width of (2/8)Ts, and the light emitting unit B does not emit light. The centroid of the light beam is denoted by a reference numeral Gc in FIG. 8C, which is shifted positively in a dir_sub direction by (2/8)× Δy12 with respect to Ga. Accordingly, the centroid of a light spot focused onto the photoconductive drum 901 is positioned on a target scanning line.

Figure 8D:
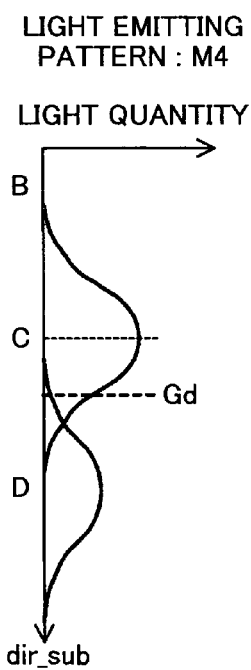

Light emitting pattern M4 is applied when the sub positional shift amount is −(3/32)×L. Specifically, the light emitting unit C emits light by a pulse width of (⅝)Ts, the light emitting unit D emits light by a pulse width of (⅜)Ts, and the light emitting unit B does not emit light. The centroid of the light beam is denoted by a reference numeral Gd in FIG. 8D, which is shifted positively in a dir_sub direction by (3/8)× Δy12 with respect to Ga. Accordingly, the centroid of a light spot focused onto the photoconductive drum 901 is positioned on a target-scanning line.

Figure 8E:
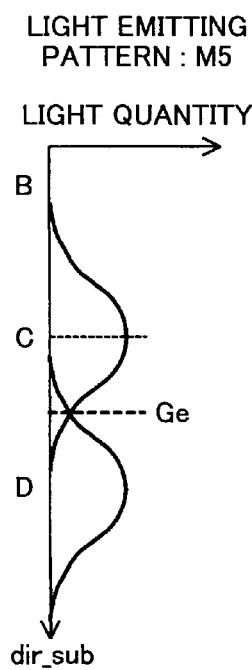

Light emitting pattern M5 is applied when the sub positional shift amount is −(4/32)×L. Specifically, the light emitting unit C emits light by a pulse width of (4/8)Ts, the light emitting unit D emits light by a pulse width of (4/8)Ts, and the light emitting unit B does not emit light. The centroid of the light beam is denoted by a reference numeral Ge in FIG. 8E, which is shifted positively in a dir_sub direction by (4/8)× Δy12 with respect to Ga. Accordingly, the centroid of a light spot focused onto the photoconductive drum 901 is positioned on a target scanning line.

Figure 8F:
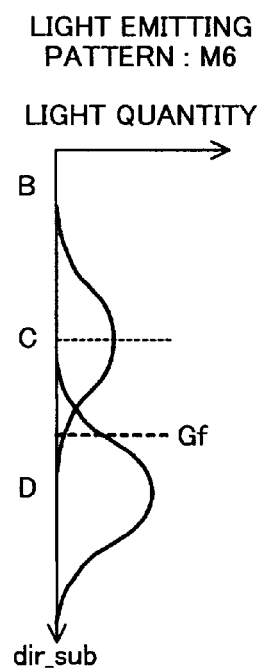

Light emitting pattern M6 is applied when the sub positional shift amount is −(5/32)×L. Specifically, the light emitting unit C emits light by a pulse width of (3/8)Ts, the light emitting unit D emits light by a pulse width of (5/8)Ts, and the light emitting unit B does not emit light. The centroid of the light beam is denoted by a reference numeral Gf in FIG. 8F, which is shifted positively in a dir_sub direction by (5/8)× Δy12 with respect to Ga. Accordingly, the centroid of a light spot focused onto the photoconductive drum 901 is positioned on a target scanning line.

Figure 9A:
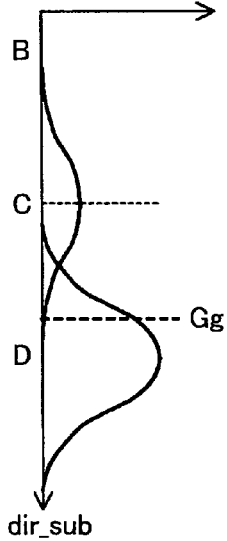
FIGS. 9A through 9F provide graphs (part 2) for describing the light emitting patterns shown in FIG. 7.

Light emitting pattern M7 is applied when the sub positional shift amount is −(6/32)×L. Specifically, the light emitting unit C emits light by a pulse width of (2/8)Ts, the light emitting unit D emits light by a pulse width of (6/8)Ts, and the light emitting unit B does not emit light. The centroid of the light beam is denoted by a reference numeral Gg in FIG. 9A, which is shifted positively in a dir_sub direction by (6/8)× Δy12 with respect to Ga. Accordingly, the centroid of a light spot focused onto the photoconductive drum 901 is positioned on a target scanning line.

Figure 9B:
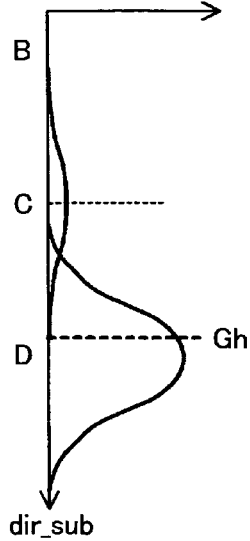

Light emitting pattern M8 is applied when the sub positional shift amount is −(7/32)×L. Specifically, the light emitting unit C emits light by a pulse width of (1/8)Ts, the light emitting unit D emits light by a pulse width of (7/8)Ts, and the light emitting unit B does not emit light. The centroid of the light beam is denoted by a reference numeral Gh in FIG. 9B, which is shifted positively in a dir_sub direction by (7/8)× Δy12 with respect to Ga. Accordingly, the centroid of a light spot focused onto the photoconductive drum 901 is positioned on a target scanning line.

Figure 9C:
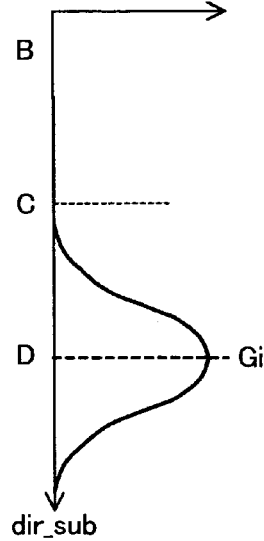

Light emitting pattern M9 is applied when the sub positional shift amount is −(8/32)×L. Specifically, the light emitting unit D emits light by a pulse width of Ts, and neither the light emitting unit C nor the light emitting unit B emits light. The centroid of the light beam is denoted by a reference numeral Gi in FIG. 9C, which substantially matches the light emitting point of the light emitting unit D. Accordingly, the centroid of a light spot focused onto the photoconductive drum 901 is positioned on a target scanning line.

Figure 9D:
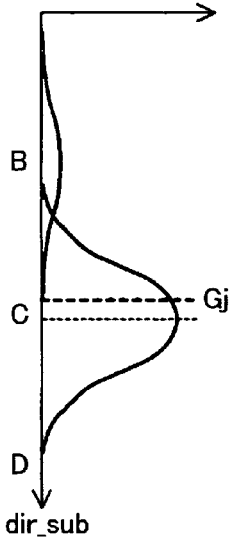

Light emitting pattern M10 is applied when the sub positional shift amount is +(1/32)×L. Specifically, the light emitting unit B emits light by a pulse width of (1/8)Ts, the light emitting unit C emits light by a pulse width of (7/8)Ts, and the light emitting unit D does not emit light. The centroid of the light beam is denoted by a reference numeral Gj in FIG. 9D, which is shifted negatively in a dir_sub direction by (1/8)× Δy12 with respect to Ga. Accordingly, the centroid of a light spot focused onto the photoconductive drum 901 is positioned on a target scanning line.

Figure 9E:
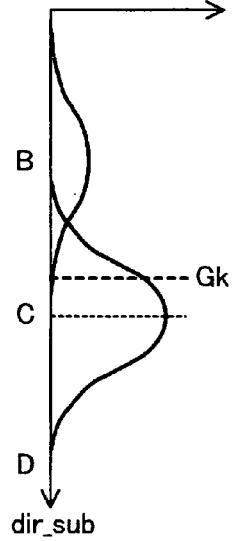

Light emitting pattern M11 is applied when the sub positional shift amount is +(2/32)×L. Specifically, the light emitting unit B emits light by a pulse width of (2/8)Ts, the light emitting unit C emits light by a pulse width of (6/8)Ts, and the light emitting unit D does not emit light. The centroid of the light beam is denoted by a reference numeral Gk in FIG. 9E, which is shifted negatively in a dir_sub direction by (2/8)× Δy12 with respect to Ga. Accordingly, the centroid of a light spot focused onto the photoconductive drum 901 is positioned on a target scanning line.

Figure 9F:
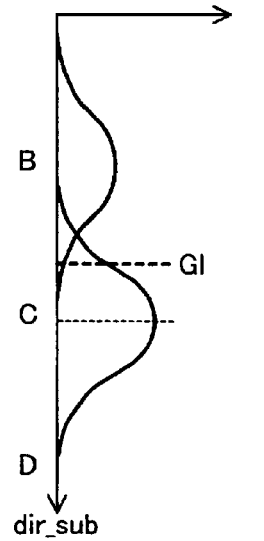

Light emitting pattern M12 is applied when the sub positional shift amount is +(3/32)×L. Specifically, the light emitting unit B emits light by a pulse width of (3/8)Ts, the light emitting unit C emits light by a pulse width of (5/8)Ts, and the light emitting unit D does not emit light. The centroid of the light beam is denoted by a reference numeral Gl in FIG. 9F, which is shifted negatively in a dir_sub direction by (3/8)× Δy12 with respect to Ga. Accordingly, the centroid of a light spot focused onto the photoconductive drum 901 is positioned on a target scanning line.

Figure 10A:
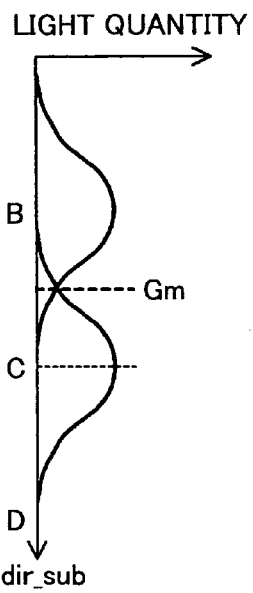
FIGS. 10A through 10E provide graphs (part 3) for describing the light emitting patterns shown in FIG. 7.

Light emitting pattern M13 is applied when the sub positional shift amount is +(4/32)×L. Specifically, the light emitting unit B emits light by a pulse width of (4/8)Ts, the light emitting unit C emits light by a pulse width of (4/8)Ts, and the light emitting unit D does not emit light. The centroid of the light beam is denoted by a reference numeral Gm in FIG. 10A, which is shifted negatively in a dir_sub direction by (4/8)×Δy12 with respect to Ga. Accordingly, the centroid of a light spot focused onto the photoconductive drum 901 is positioned on a target scanning line.

Figure 10B:
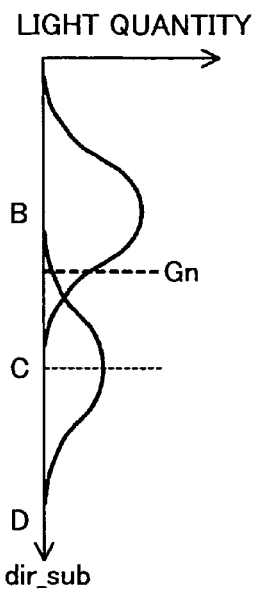

Light emitting pattern M14 is applied when the sub positional shift amount is +(5/32)×L. Specifically, the light emitting unit B emits light by a pulse width of (5/8)Ts, the light emitting unit C emits light by a pulse width of (3/8)Ts, and the light emitting unit D does not emit light. The centroid of the light beam is denoted by a reference numeral Gn in FIG. 10B, which is shifted negatively in a dir_sub direction by (5/8)× Δy12 with respect to Ga. Accordingly, the centroid of a light spot focused onto the photoconductive drum 901 is positioned on a target scanning line.

Figure 10C:
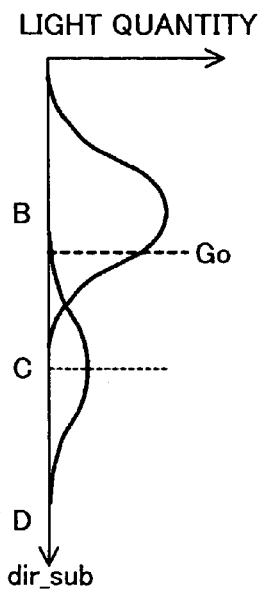

Light emitting pattern M15 is applied when the sub positional shift amount is +(6/32)×L. Specifically, the light emitting unit B emits light by a pulse width of (6/8)Ts, the light emitting unit C emits light by a pulse width of (2/8)Ts, and the light emitting unit D does not emit light. The centroid of the light beam is denoted by a reference numeral Go in FIG. 10C, which is shifted negatively in a dir_sub direction by (6/8)× Δy12 with respect to Ga. Accordingly, the centroid of a light spot focused onto the photoconductive drum 901 is positioned on a target scanning line.

Figure 10D:
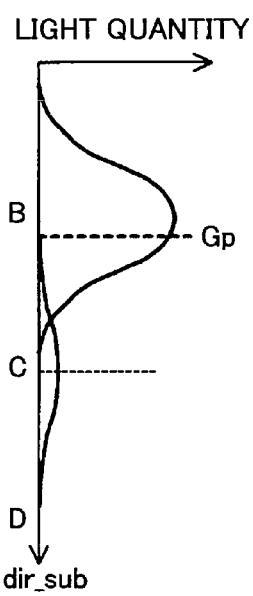

Light emitting pattern M16 is applied when the sub positional shift amount is +(7/32)×L. Specifically, the light emitting unit B emits light by a pulse width of (7/8)Ts, the light emitting unit C emits light by a pulse width of (1/8)Ts, and the light emitting unit D does not emit light. The centroid of the light beam is denoted by a reference numeral Gp in FIG. 10D, which is shifted negatively in a dir_sub direction by (7/8)× Δy12 with respect to Ga. Accordingly, the centroid of a light spot focused onto the photoconductive drum 901 is positioned on a target scanning line.

Figure 10E:
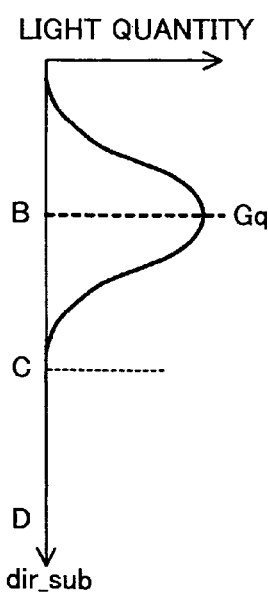

Light emitting pattern M17 is applied when the sub positional shift amount is +(8/32)×L. Specifically, the light emitting unit B emits light by a pulse width of Ts, and neither the light emitting unit C nor the light emitting unit D emits light. The centroid of the light beam is denoted by a reference numeral Gq in FIG. 10E, which substantially matches the light emitting point of the light emitting unit B. Accordingly, the centroid of a light spot focused onto the photoconductive drum 901 is positioned on a target scanning line.

By applying these light emitting patterns, the centroid of a light beam from the light source unit 801 can be shifted in the dir_sub direction, while the light quantity of the light beam from the light source unit 801 is maintained at a fixed level. In an embodiment of the invention, the correction amount for a sub scanning direction positional shift is expressed in units of L/32.

Figures 11A, 11B:
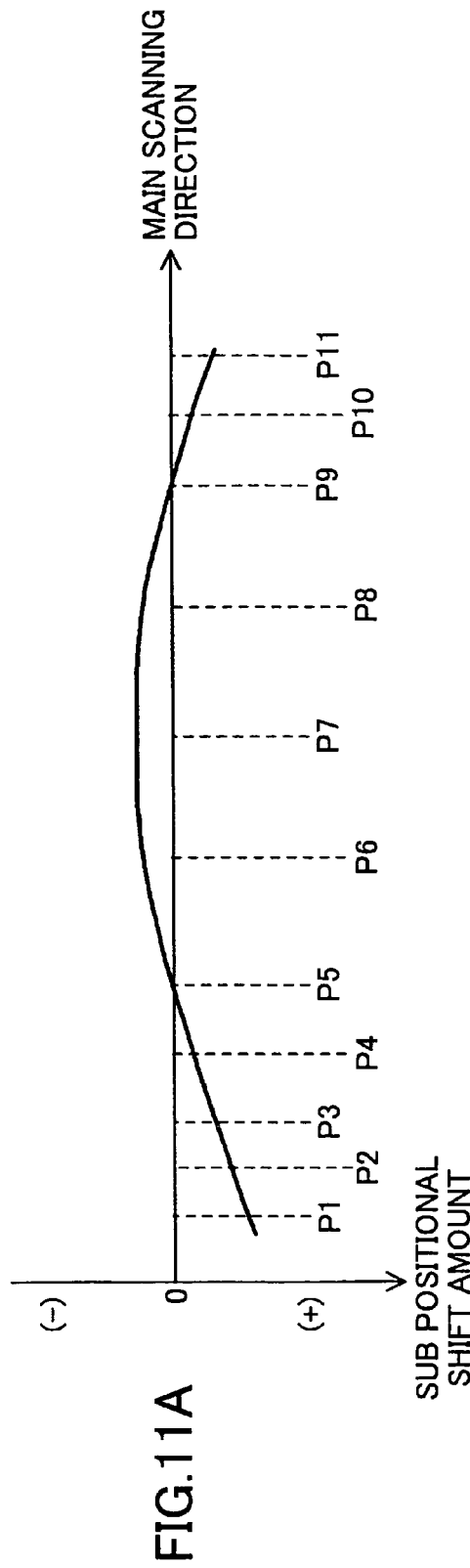
FIGS. 11A, 11B describe relationships between positions in a main scanning direction and sub positional shift amounts in an image formed on a photoconductive drum when a light emitting unit C is serving as a light source for scanning.

FIGS. 11A, 11B are a graph and table for describing sub positional shift amounts of line 1. The following is a description of a method of correcting the sub scanning direction positional shift, performed by the modulation data generating circuit 30. The sub positional shift amount at a position P1 in the main scanning direction is +(½)×L, the sub positional shift amount at a position P2 in the main scanning direction is +(⅜)×L, the sub positional shift amount at a position P3 in the main scanning direction is +(¼)×L, the sub positional shift amount at a position P4 in the main scanning direction is +(⅛)×L, the sub positional shift amount at a position P5 in the main scanning direction is 0, the sub positional shift amount at a position P6 in the main scanning direction is −(⅛)×L, the sub positional shift amount at a position P7 in the main scanning direction is −(¼)×L, the sub positional shift amount at a position P8 in the main scanning direction is −(⅛)×L, the sub positional shift amount at a position P9 in the main scanning direction is 0, the sub positional shift amount at a position P10 in the main scanning direction is +(⅛)×L, and the sub positional shift amount at a position P11 in the main scanning direction is +(¼)×L. As shown in FIG. 11B, the correction amount for the sub positional shift amount at each position in the main scanning direction is determined according to the sub positional shift amount.

Figure 14:
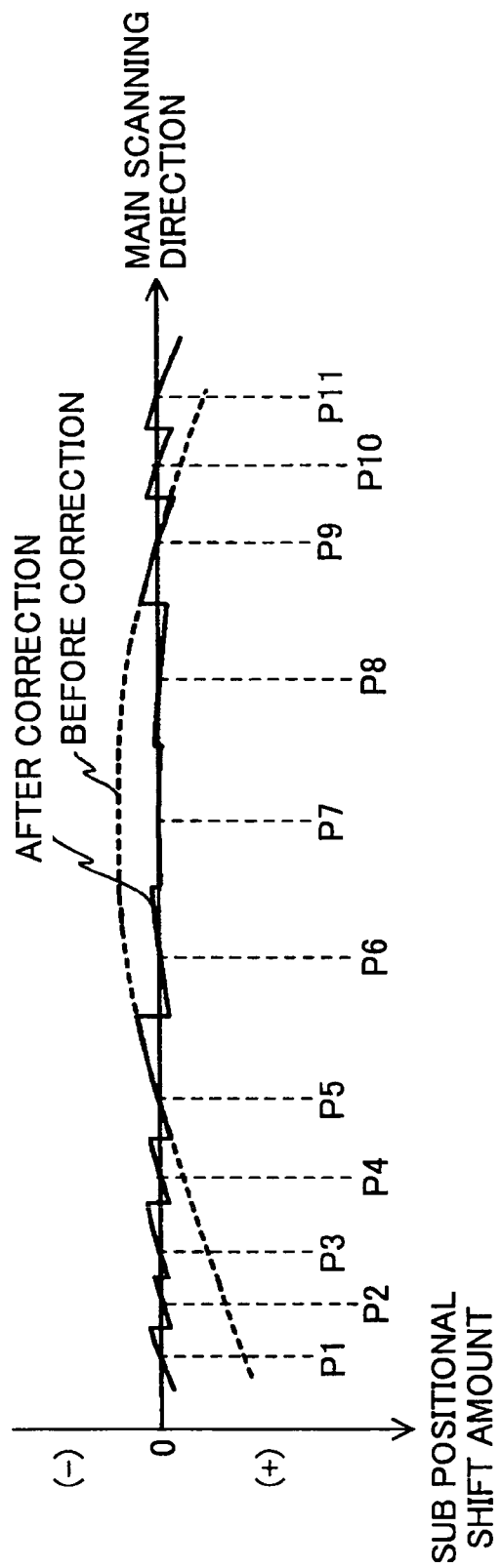
FIG. 14 describes relationships between positions in a main scanning direction and sub positional shift amounts when the light sources for scanning are selected as shown in FIGS. 12A through 13.

1. When the scanning position in the main scanning direction approaches the position P1, the modulation data generating circuit 30 selects the light emitting unit A as the light source to be used for scanning, as shown in FIG. 12A. At this time, the light emitting unit A emits light by a pulse width of Ts. Accordingly, the sub positional shift amount at the position P1 becomes substantially 0, as shown in the example graph of FIG. 14.

2. When the scanning position in the main scanning direction approaches a midpoint between the position P1 and the position P2, the modulation data generating circuit 30 selects the light emitting unit A and the light emitting unit B as the light sources to be used for scanning, as shown in FIG. 12B. At this time, both the light emitting unit A and the light emitting unit B emit light by a pulse width of (½)Ts. Accordingly, the sub positional shift amount at the position P2 becomes substantially 0, as shown in the example graph of FIG. 14.

3. When the scanning position in the main scanning direction approaches a midpoint between the position P2 and the position P3, the modulation data generating circuit 30 selects the light emitting unit B as the light source to be used for scanning, as shown in FIG. 12C. At this time, the light emitting unit B emits light by a pulse width Ts. Accordingly, the sub positional shift amount at the position P3 becomes substantially 0, as shown in the example graph of FIG. 14.

4. When the scanning position in the main scanning direction approaches a midpoint between the position P3 and the position P4, the modulation data generating circuit 30 selects the light emitting unit B and the light emitting unit C as the light sources to be used for scanning, as shown in FIG. 12D. At this time, both the light emitting unit B and the light emitting unit C emit light by a pulse width of (½)Ts. Accordingly, the sub positional shift amount at the position P4 becomes substantially 0, as shown in the example graph of FIG. 14.

5. When the scanning position in the main scanning direction approaches a midpoint between the position P4 and the position P5, the modulation data generating circuit 30 selects the light emitting unit C as the light source to be used for scanning, as shown in FIG. 12E. At this time, the light emitting unit C emits light by a pulse width Ts. Accordingly, the sub positional shift amount at the position P5 becomes substantially 0, as shown in the example graph of FIG. 14.

6. When the scanning position in the main scanning direction approaches a midpoint between the position P5 and the position P6, the modulation data generating circuit 30 selects the light emitting unit C and the light emitting unit D as the light sources to be used for scanning, as shown in FIG. 12F. At this time, both the light emitting unit C and the light emitting unit D emit light by a pulse width of (½)Ts. Accordingly, the sub positional shift amount at the position P6 becomes substantially 0, as shown in the example graph of FIG. 14.

7. When the scanning position in the main scanning direction approaches a midpoint between the position P6 and the position P7, the modulation data generating circuit 30 selects the light emitting unit D as the light source to be used for scanning, as shown in FIG. 13A. At this time, the light emitting unit D emits light by a pulse width Ts. Accordingly, the sub positional shift amount at the position P7 becomes substantially 0, as shown in the example graph of FIG. 14.

8. When the scanning position in the main scanning direction approaches a midpoint between the position P7 and the position P8, the modulation data generating circuit 30 selects the light emitting unit C and the light emitting unit D as the light sources to be used for scanning, as shown in FIG. 13B. At this time, both the light emitting unit C and the light emitting unit D emit light by a pulse width of (½)Ts. Accordingly, the sub positional shift amount at the position P8 becomes substantially 0, as shown in the example graph of FIG. 14.

9. When the scanning position in the main scanning direction approaches a midpoint between the position P8 and the position P9, the modulation data generating circuit 30 selects the light emitting unit C as the light source to be used for scanning, as shown in FIG. 13C. At this time, the light emitting unit C emits light by a pulse width Ts. Accordingly, the sub positional shift amount at the position P9 becomes substantially 0, as shown in the example graph of FIG. 14.

10. When the scanning position in the main scanning direction approaches a midpoint between the position P9 and the position P10, the modulation data generating circuit 30 selects the light emitting unit B and the light emitting unit C as the light sources to be used for scanning, as shown in FIG. 13D. At this time, both the light emitting unit B and the light emitting unit C emit light by a pulse width of (½)Ts. Accordingly, the sub positional shift amount at the position P10 becomes substantially 0, as shown in the example graph of FIG. 14.

11. When the scanning position in the main scanning direction approaches a midpoint between the position P10 and the position P11, the modulation data generating circuit 30 selects the light emitting unit B as the light source to be used for scanning, as shown in FIG. 13E. At this time, the light emitting unit B emits light by a pulse width Ts. Accordingly, the sub positional shift amount at the position P11 becomes substantially 0, as shown in the example. graph of FIG. 14.

As described above, during the scanning operation, according the sub positional shift amount, the modulation data generating circuit 30 controls driving of the light source unit 801 by selecting one or two light emitting units from plural light emitting units as the light sources. As a result, the sub positional shift amounts are reduced overall as shown in the example graph of FIG. 14, so that image quality is improved.

Sub positional shift amounts of line 2 are also corrected in the same manner.

As described above, a transfer unit of the laser printer 100 according to an embodiment includes the electrostatic charger 902, the developing roller 903, the toner cartridge 904, and the transfer charger 911.

A control unit of the optical scanner 900 is realized by the modulation data generating circuit 30.

In an optical scanner 900 according to an embodiment of the present invention, the light source unit 801 is configured by the semiconductor laser LD including nine light emitting units. The modulation data generating circuit 30 controls driving of the light source unit 801 by selecting one or two light emitting units as the light source(s) used for scanning according to the sub positional shift amount. Accordingly, sub scanning direction positional shifts can be precisely corrected without incurring high costs.

Further, in an optical scanner 900 according to an embodiment of the present invention, the modulation data generating circuit 30 selects two light emitting units adjacent to each other in the dir_sub direction as the light sources, and controls the pulse widths of the driving signals of the light emitting units. Therefore, the algorithm for correcting the sub scanning direction shifts can be simplified.

Moreover, in an optical scanner 900 according to an embodiment of the present invention, the modulation data generating circuit 30 selects two light emitting units adjacent to each other in the dir_sub direction as the light sources, and controls the total light quantity of light beams emitted from the selected light emitting units so as to match a predetermined value. Therefore, unevenness in density can be prevented.

Further, in an optical scanner 900 according to an embodiment of the present invention, plural light emitting units are formed on a single chip. Therefore, intervals between the light emitting units substantially conform to the design. Accordingly, the sub scanning direction shifts can be precisely corrected. Moreover, power consumption can be reduced compared to a configuration employing plural light source units.

The laser printer 100 according to an embodiment of the present invention is equipped with the optical scanner 900 capable of precisely correcting the sub scanning direction shifts. Accordingly, high-quality images can be formed.

In an embodiment of the present invention, 17 types of light emitting patterns (M1 through M17) are employed; however, the present invention is not limited thereto.

In an embodiment of the present invention, the number of light emitting patterns is the same for positive sub scanning direction positional shifts and negative sub scanning direction positional shifts; however, the present invention is not limited thereto. The number of light emitting patterns can be different for positive sub scanning direction positional shifts and negative sub scanning direction positional shifts.

In an embodiment of the present invention, a light emitting unit C is designated as a default light source used for scanning with line 1; however, the present invention is not limited thereto.

In an embodiment of the present invention, a light emitting unit G is designated as a default light source used for scanning with line 2; however, the present invention is not limited thereto.

In an embodiment of the present invention, scanning is performed by using two scanning lines simultaneously; however, the present invention is not limited thereto.

Figure 15:
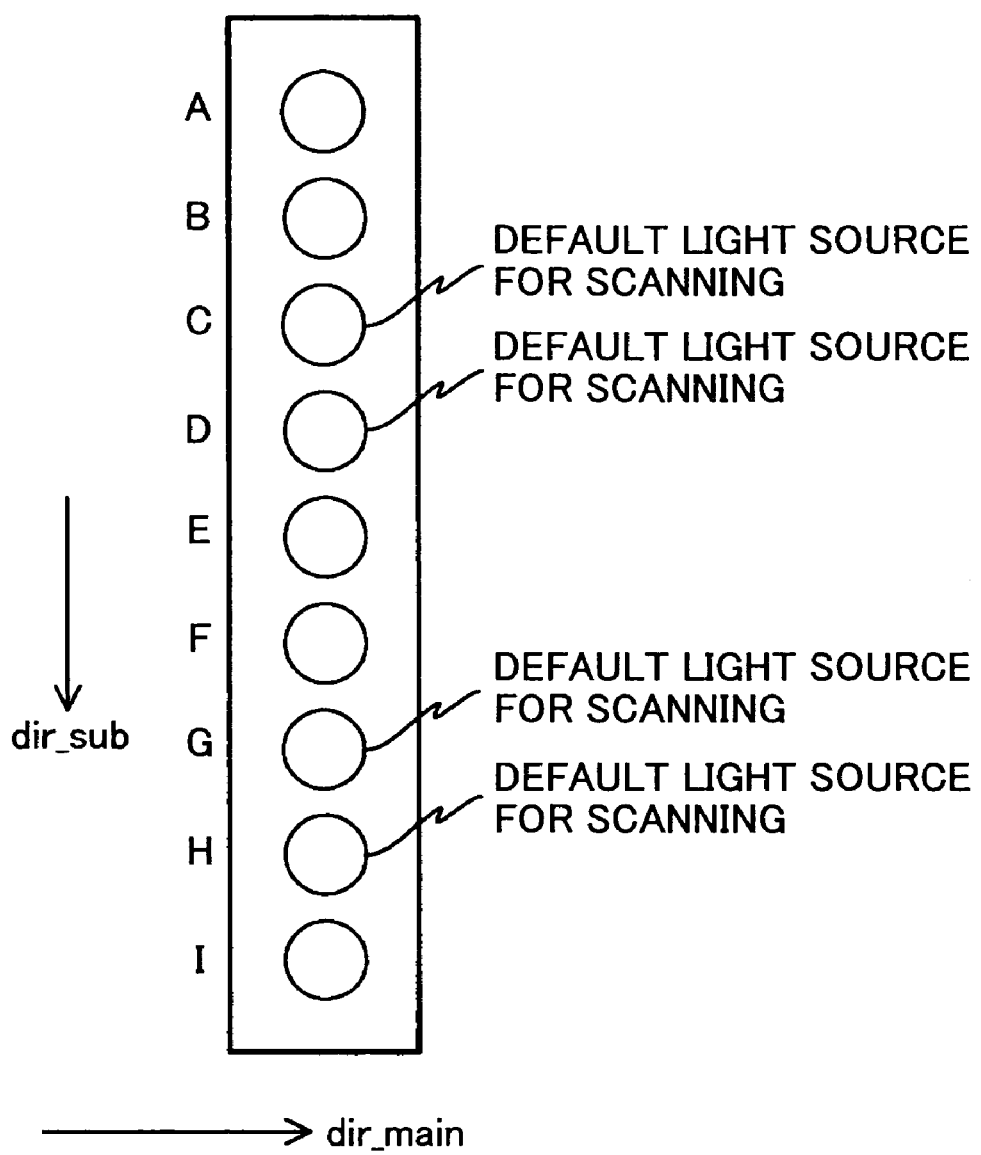
FIG. 15 is a schematic diagram in which two default light sources are designated for each scanning line.

In an embodiment of the present invention, a single light emitting unit serves as the default light source for one scanning line; however, the present invention is not limited thereto. For example, when the light quantity of a light beam emitted by one light emitting unit is small, plural light emitting units can be designated as the default light source used for scanning with one scanning line. FIG. 15 shows an example in which the light emitting units C and D are designated as the default light source used for scanning with line 1, and the light emitting units G and H are designated as the default light source used for scanning with line 2. Details are described below.

In order to correct sub scanning direction positional shifts of line 1 by the same precision as in the above-described embodiment, the modulation data generating circuit 30 selects any one of the 17 types of light emitting patterns (Q1 through Q17) shown in the example of FIG. 16.

Figure 17A:
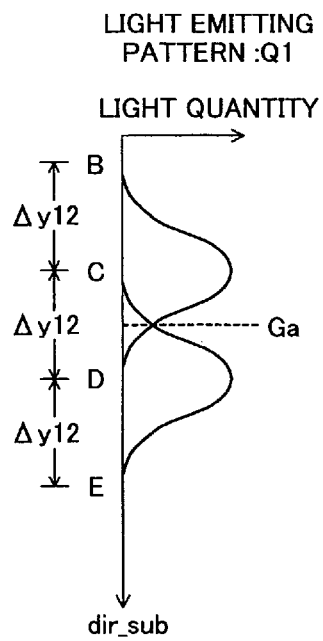
FIGS. 17A through 17F provide graphs (part 1) for describing the light emitting patterns shown in FIG. 16.

Light emitting pattern Q1 is applied when the sub positional shift amount is 0. Specifically, the light emitting unit C and the light emitting unit D both emit light by a regular pulse width Ts, and neither the light emitting unit B nor the light emitting unit E emits light. The centroid of the light beam is denoted by a reference numeral Ga in FIG. 17A, which substantially matches the middle position between the light emitting point of the light emitting unit C and the light emitting point of the light emitting unit D. In this case, the centroid of a light spot focused onto the photoconductive drum 901 is positioned on a target scanning line.

Figure 17B:
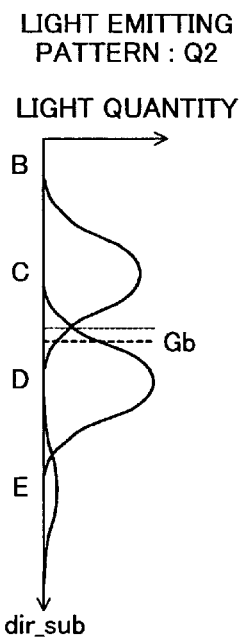

Light emitting pattern Q2 is applied when the sub positional shift amount is $-(1/32) \times L$. Specifically, the light emitting unit C emits light by a pulse width of $(7/8)Ts$, the light emitting unit D emits light by a regular pulse width of Ts, the light emitting unit E emits light by a pulse width of $(1/8)Ts$, and the light emitting unit B does not emit light. The centroid of the light beam is denoted by a reference numeral Gb in FIG. 17B, which is shifted positively in a dir_sub direction by $(1/8) \times \Delta y12$ with respect to Ga. Accordingly, the centroid of a light spot focused onto the photoconductive drum 901 is positioned on a target scanning line.

Figure 17C:
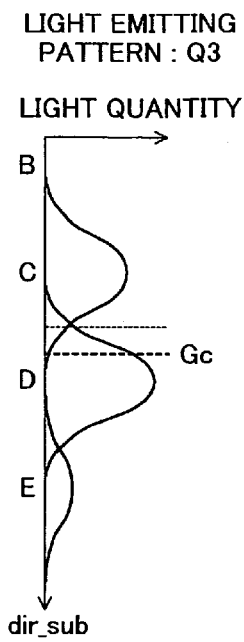

Light emitting pattern Q3 is applied when the sub positional shift amount is $-(2/32) \times L$. Specifically, the light emitting unit C emits light by a pulse width of $(6/8)Ts$, the light emitting unit D emits light by a regular pulse width of Ts, the light emitting unit E emits light by a pulse width of $(2/8)Ts$, and the light emitting unit B does not emit light. The centroid of the light beam is denoted by a reference numeral Gc in FIG. 17C, which is shifted positively in a dir_sub direction by $(2/8) \times \Delta y12$ with respect to Ga. Accordingly, the centroid of a light spot focused onto the photoconductive drum 901 is positioned on a target scanning line.

Figure 17D:
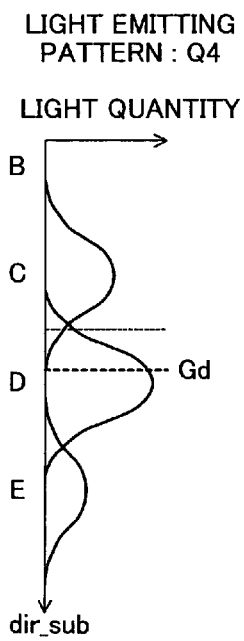

Light emitting pattern Q4 is applied when the sub positional shift amount is $-(3/32) \times L$. Specifically, the light emitting unit C emits light by a pulse width of $(5/8)Ts$, the light emitting unit D emits light by a regular pulse width of Ts, the light emitting unit E emits light by a pulse width of $(3/8)Ts$, and the light emitting unit B does not emit light. The centroid of the light beam is denoted by a reference numeral Gd in FIG. 17D, which is shifted positively in a dir_sub direction by $(3/8) \times \Delta y12$ with respect to Ga. Accordingly, the centroid of a light spot focused onto the photoconductive drum 901 is positioned on a target scanning line.

Figure 17E:
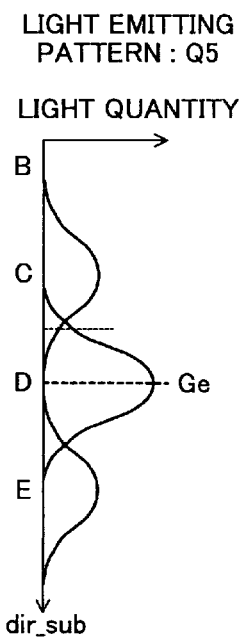

Light emitting pattern Q5 is applied when the sub positional shift amount is $-(4/32) \times L$. Specifically, the light emitting unit C emits light by a pulse width of $(4/8)Ts$, the light emitting unit D emits light by a regular pulse width of Ts, the light emitting unit E emits light by a pulse width of (4/8)Ts, and the light emitting unit B does not emit light. The centroid of the light beam is denoted by a reference numeral Ge in FIG. 17E, which is shifted positively in a dir_sub direction by (4/8)×Δy12 with respect to Ga. Accordingly, the centroid of a light spot focused onto the photoconductive drum 901 is positioned on a target scanning line.

Figure 17F:
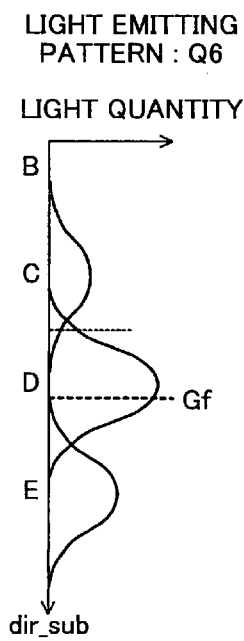

Light emitting pattern Q6 is applied when the sub positional shift amount is −(5/32)×L. Specifically, the light emitting unit C emits light by a pulse width of (3/8)Ts, the light emitting unit D emits light by a regular pulse width of Ts, the light emitting unit E emits light by a pulse width of (5/8)Ts, and the light emitting unit B does not emit light. The centroid of the light beam is denoted by a reference numeral Gf in FIG. 17F, which is shifted positively in a dir_sub direction by (5/8)×Δy12 with respect to Ga. Accordingly, the centroid of a light spot focused onto the photoconductive drum 901 is positioned on a target scanning line.

Figure 18A:
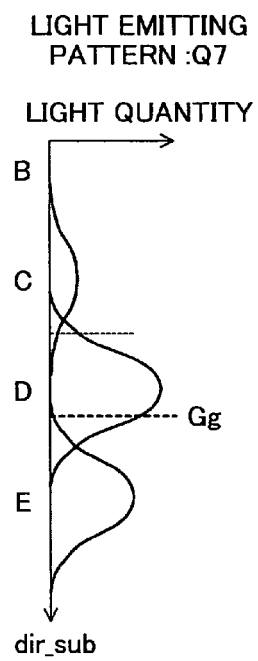
FIGS. 18A through 18F provide graphs (part 2) for describing the light emitting patterns shown in FIG. 16.

Light emitting pattern Q7 is applied when the sub positional shift amount is −(6/32)×L. Specifically, the light emitting unit C emits light by a pulse width of (2/8)Ts, the light emitting unit D emits light by a regular pulse width of Ts, the light emitting unit E emits light by a pulse width of (6/8)Ts, and the light emitting unit B does not emit light. The centroid of the light beam is denoted by a reference numeral Gg in FIG. 18A, which is shifted positively in a dir_sub direction by (6/8)×Δy12 with respect to Ga. Accordingly, the centroid of a light spot focused onto the photoconductive drum 901 is positioned on a target scanning line.

Figure 18B:
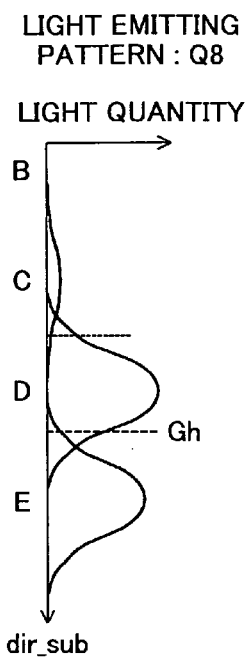

Light emitting pattern Q8 is applied when the sub positional shift amount is −(7/32)×L. Specifically, the light emitting unit C emits light by a pulse width of (1/8)Ts, the light emitting unit D emits light by a regular pulse width of Ts, the light emitting unit E emits light by a pulse width of (7/8)Ts, and the light emitting unit B does not emit light. The centroid of the light beam is denoted by a reference numeral Gh in FIG. 18B, which is shifted positively in a dir_sub direction by (7/8)×Δy12 with respect to Ga. Accordingly, the centroid of a light spot focused onto the photoconductive drum 901 is positioned on a target scanning line.

Figure 18C:
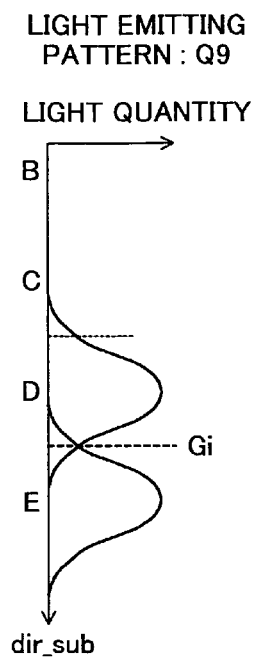

Light emitting pattern Q9 is applied when the sub positional shift amount is −(8/32)×L. Specifically, the light emitting unit D and the light emitting unit E both emit light by a regular pulse width Ts, and neither the light emitting unit C nor the light emitting unit B emits light. The centroid of the light beam is denoted by a reference numeral Gi in FIG. 18C, which substantially matches the middle position between the light emitting point of the light emitting unit D and the light emitting point of the light emitting unit E. In this case, the centroid of a light spot focused onto the photoconductive drum 901 is positioned on a target scanning line.

Figure 18D:
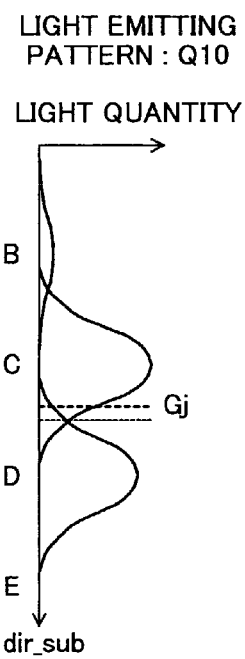

Light emitting pattern Q10 is applied when the sub positional shift amount is +(1/32)×L. Specifically, the light emitting unit C emits light by a regular pulse width Ts, the light emitting unit emits D light by a pulse width of (7/8)Ts, the light emitting unit B light by a pulse width of (1/8)Ts, and the light emitting unit E does not emit light. The centroid of the light beam is denoted by a reference numeral Gj in FIG. 18D, which is shifted negatively in a dir_sub direction by (1/8)×Δy12 with respect to Ga. Accordingly, the centroid of a light spot focused onto the photoconductive drum 901 is positioned on a target scanning line.

Figure 18E:
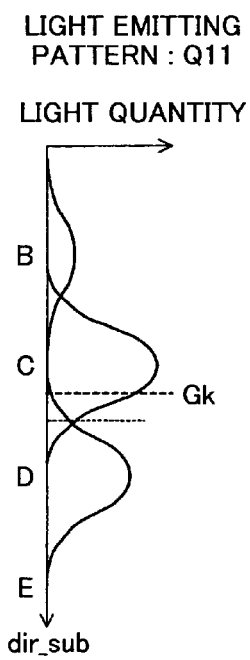

Light emitting pattern Q11 is applied when the sub positional shift amount is +(2/32)×L. Specifically, the light emitting unit C emits light by a regular pulse width of Ts, the light emitting unit D emits light by a pulse width of (6/8)Ts, the light emitting unit B emits light by a pulse width of (2/8)Ts, and the light emitting unit E does not emit light. The centroid of the light beam is denoted by a reference numeral Gk in FIG. 18E, which is shifted negatively in a dir_sub direction by (2/8)×Δy12 with respect to Ga. Accordingly, the centroid of a light spot focused onto the photoconductive drum 901 is positioned on a target scanning line.

Figure 18F:
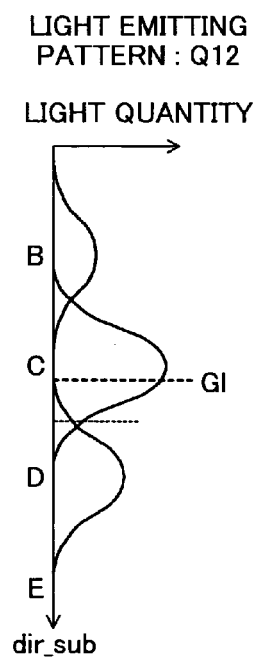

Light emitting pattern Q12 is applied when the sub positional shift amount is +(3/32)×L. Specifically, the light emitting unit C emits light by a regular pulse width of Ts, the light emitting unit D emits light by a pulse width of (5/8)Ts, the light emitting unit B emits light by a pulse width of (3/8)Ts, and the light emitting unit E does not emit light. The centroid of the light beam is denoted by a reference numeral Gl in FIG. 18F, which is shifted negatively in a dir_sub direction by (3/8)×Δy12 with respect to Ga. Accordingly, the centroid of a light spot focused onto the photoconductive drum 901 is positioned on a target scanning line.

Figure 19A:
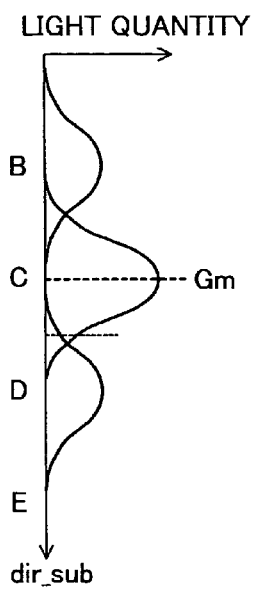
FIGS. 19A through 19E provide graphs (part 3) for describing the light emitting patterns shown in FIG. 16.

Light emitting pattern Q13 is applied when the sub positional shift amount is +(4/32)×L. Specifically, the light emitting unit C emits light by a regular pulse width of Ts, the light emitting unit D emits light by a pulse width of (4/8)Ts, the light emitting unit B emits light by a pulse width of (4/8)Ts, and the light emitting unit E does not emit light. The centroid of the light beam is denoted by a reference numeral Gm in FIG. 19A, which is shifted negatively in a dir_sub direction by (4/8)×Δy12 with respect to Ga. Accordingly, the centroid of a light spot focused onto the photoconductive drum 901 is positioned on a target scanning line.

Figure 19B:
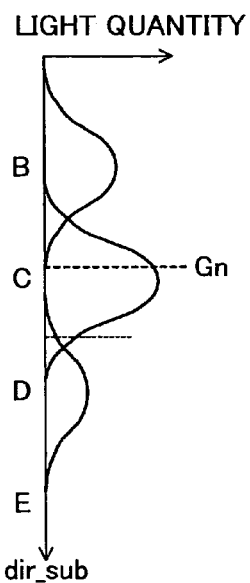

Light emitting pattern Q14 is applied when the sub positional shift amount is +(5/32)×L. Specifically, the light emitting unit C emits light by a regular pulse width of Ts, the light emitting unit D emits light by a pulse width of (3/8)Ts, the light emitting unit B emits light by a pulse width of (5/8)Ts, and the light emitting unit E does not emit light. The centroid of the light beam is denoted by a reference numeral Gn in FIG. 19B, which is shifted negatively in a dir_sub direction by (5/8)×Δy12 with respect to Ga. Accordingly, the centroid of a light spot focused onto the photoconductive drum 901 is positioned on a target scanning line.

Figure 19C:
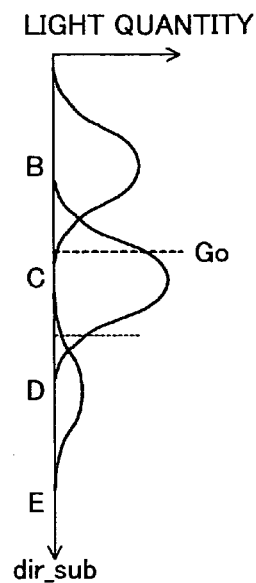

Light emitting pattern Q15 is applied when the sub positional shift amount is +(6/32)×L. Specifically, the light emitting unit C emits light by a regular pulse width of Ts, the light emitting unit D emits light by a pulse width of (2/8)Ts, the light emitting unit B emits light by a pulse width of (6/8)Ts, and the light emitting unit E does not emit light. The centroid of the light beam is denoted by a reference numeral Go in FIG. 19C, which is shifted negatively in a dir_sub direction by (6/8)×Δy12 with respect to Ga. Accordingly, the centroid of a light spot focused onto the photoconductive drum 901 is positioned on a target scanning line.

Figure 19D:
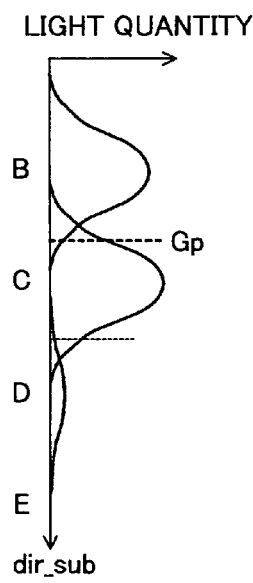

Light emitting pattern Q16 is applied when the sub positional shift amount is +(7/32)×L. Specifically, the light emitting unit C emits light by a regular pulse width of Ts, the light emitting unit D emits light by a pulse width of (1/8)Ts, the light emitting unit B emits light by a pulse width of (7/8)Ts, and the light emitting unit E does not emit light. The centroid of the light beam is denoted by a reference numeral Gp in FIG. 19D, which is shifted negatively in a dir_sub direction by (7/8)×Δy12 with respect to Ga. Accordingly, the centroid of a light spot focused onto the photoconductive drum 901 is positioned on a target scanning line.

Figure 19E:
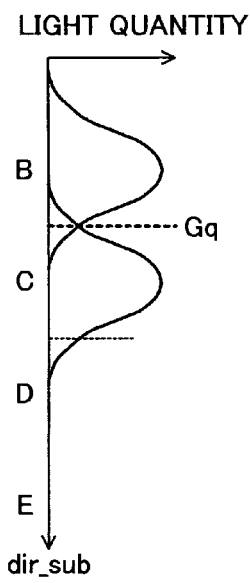

Light emitting pattern Q17 is applied when the sub positional shift amount is +(8/32)×L. Specifically, the light emitting unit B and the light emitting unit C emit light by a regular pulse width of Ts, and neither the light emitting unit D nor the light emitting unit E emits light. The centroid of the light beam is denoted by a reference numeral Gq in FIG. 19E, which substantially matches the middle position between the light emitting point of the light emitting unit B and the light emitting point of the light emitting unit C.

The following is a description of a method of correcting these sub scanning direction positional shifts performed by the modulation data generating circuit 30, assuming that the sub positional shift amounts of line 1 are the same as those in the above embodiment (cf. FIGS. 11A, 11B).

1. When the scanning position in the main scanning direction approaches the position P1, the modulation data generating circuit 30 selects the light emitting unit A and the light emitting unit B as the light source to be used for scanning, as shown in FIG. 20A. At this time, the light emitting unit A and the light emitting unit B emit light by a pulse width of Ts. Accordingly, the sub positional shift amount at the position P1 becomes substantially 0.

2. When the scanning position in the main scanning direction approaches a midpoint between the position P1 and the position P2, the modulation data generating circuit 30 selects the light emitting unit A, the light emitting unit B, and the light emitting unit C as the light sources to be used for scanning, as shown in FIG. 20B. At this time, the light emitting unit A and the light emitting unit C both emit light by a pulse width (½)Ts, and the light emitting unit B emits light by a pulse width Ts. Accordingly, the sub positional shift amount at the position P2 becomes substantially 0.

3. When the scanning position in the main scanning direction approaches a midpoint between the position P2 and the position P3, the modulation data generating circuit 30 selects the light emitting unit B and the light emitting unit C as the light source to be used for scanning, as shown in FIG. 20C. At this time, the light emitting unit B and the light emitting unit C emit light by a pulse width of Ts. Accordingly, the sub positional shift amount at the position P3 becomes substantially 0.

4. When the scanning position in the main scanning direction approaches a midpoint between the position P3 and the position P4, the modulation data generating circuit 30 selects the light emitting unit B, the light emitting unit C, and the light emitting unit D as the light sources to be used for scanning, as shown in FIG. 20D. At this time, the light emitting unit B and the light emitting unit D both emit light by a pulse width (½)Ts, and the light emitting unit C emits light by a pulse width Ts. Accordingly, the sub positional shift amount at the position P4 becomes substantially 0.

5. When the scanning position in the main scanning direction approaches a midpoint between the position P4 and the position P5, the modulation data generating circuit 30 selects the light emitting unit C and the light emitting unit D, as shown in FIG. 20E. At this time, the light emitting unit C and the light emitting unit D both emit light by a pulse width Ts. Accordingly, the sub positional shift amount at the position P5 becomes substantially 0.

6. When the scanning position in the main scanning direction approaches a midpoint between the position P5 and the position P6, the modulation data generating circuit 30 selects the light emitting unit C, the light emitting unit D, and the light emitting unit E as the light sources to be used for scanning, as shown in FIG. 20F. At this time, the light emitting unit C and the light emitting unit E both emit light by a pulse width (½)Ts, and the light emitting unit D emits light by a pulse width Ts. Accordingly, the sub positional shift amount at the position P6 becomes substantially 0.

7. When the scanning position in the main scanning direction approaches a midpoint between the position P6 and the position P7, the modulation data generating circuit 30 selects the light emitting unit D and the light emitting unit E as the light source to be used for scanning, as shown in FIG. 21A. At this time, the light emitting unit D and the light emitting unit E emit light by a pulse width of Ts. Accordingly, the sub positional shift amount at the position P7 becomes substantially 0.

8. When the scanning position in the main scanning direction approaches a midpoint between the position P7 and the position P8, the modulation data generating circuit 30 selects the light emitting unit C, the light emitting unit D, and the light emitting unit E as the light sources to be used for scanning, as shown in FIG. 21B. At this time, the light emitting unit C and the light emitting unit E both emit light by a pulse width (½)Ts, and the light emitting unit D emits light by a pulse width Ts. Accordingly, the sub positional shift amount at the position P8 becomes substantially 0.

9. When the scanning position in the main scanning direction approaches a midpoint between the position P8 and the position P9, the modulation data generating circuit 30 selects the light emitting unit C and the light emitting unit D, as shown in FIG. 21C. At this time, the light emitting unit C and the light emitting unit D both emit light by a pulse width Ts. Accordingly, the sub positional shift amount at the position P9 becomes substantially 0.

10. When the scanning position in the main scanning direction approaches a midpoint between the position P9 and the position P10, the modulation data generating circuit 30 selects the light emitting unit B, the light emitting unit C, and the light emitting unit D as the light sources to be used for scanning, as shown in FIG. 21D. At this time, the light emitting unit B and the light emitting unit D both emit light by a pulse width (½)Ts, and the light emitting unit C emits light by a pulse width Ts. Accordingly, the sub positional shift amount at the position P10 becomes substantially 0.

11. When the scanning position it the main scanning direction approaches a midpoint between the position P10 and the position P11, the modulation data generating circuit 30 selects the light emitting unit B and the light emitting unit C as the light source to be used for scanning, as shown in FIG. 21E. At this time, the light emitting unit B and the light emitting unit C emit light by a pulse width of Ts. Accordingly, the sub positional shift amount at the position P11 becomes substantially 0.

As described above, during the scanning operation, according to the sub positional shift amount, the modulation data generating circuit 30 controls driving of the light source unit 801 by selecting two or three light emitting units from plural light emitting units as the light sources. As a result, similar to the above embodiment, the sub positional shift amounts are reduced overall, so that image quality is improved.

Sub positional shift amounts of line 2 are also corrected in the same manner.

In an embodiment of the present invention, the correction amount for a sub scanning direction positional shift is expressed in units of L/32; however, the present invention is not limited thereto.

Figure 22:
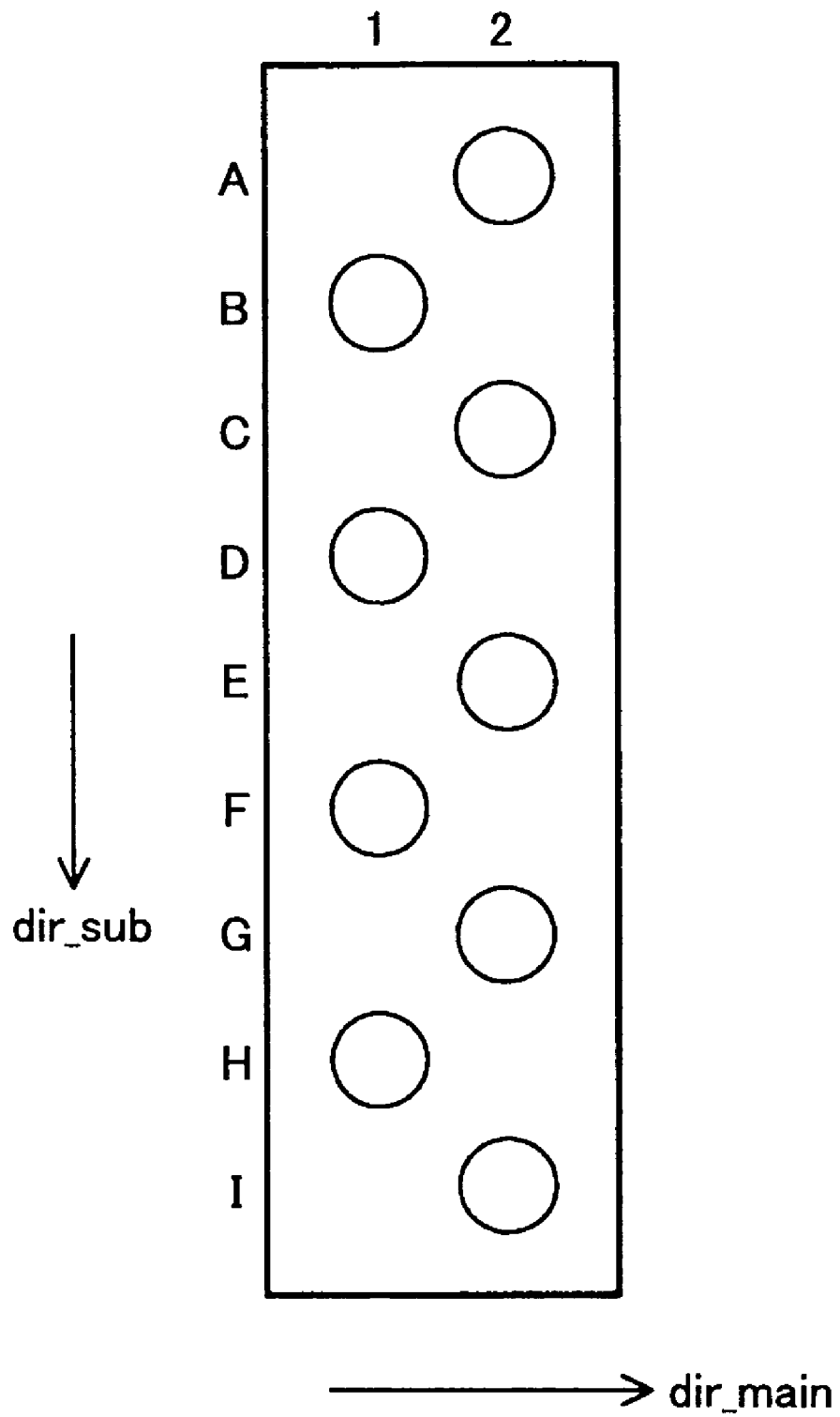
FIG. 22 is a schematic diagram of a modification example of the semiconductor laser shown in FIG. 3.

In an embodiment of the present invention, the nine light emitting units are arranged in a row and are equally spaced apart in a dir_sub direction; however, the present invention is not limited thereto. For example, as shown in FIG. 22, the light emitting units can be arranged in a zigzag manner. Such arrangement mitigates or prevents a so called heat crosstalk from occurring. A heat crosstalk occurs when light emitting properties of a light emitting unit change due to a temperature rise of another light emitting unit.

Figure 23:
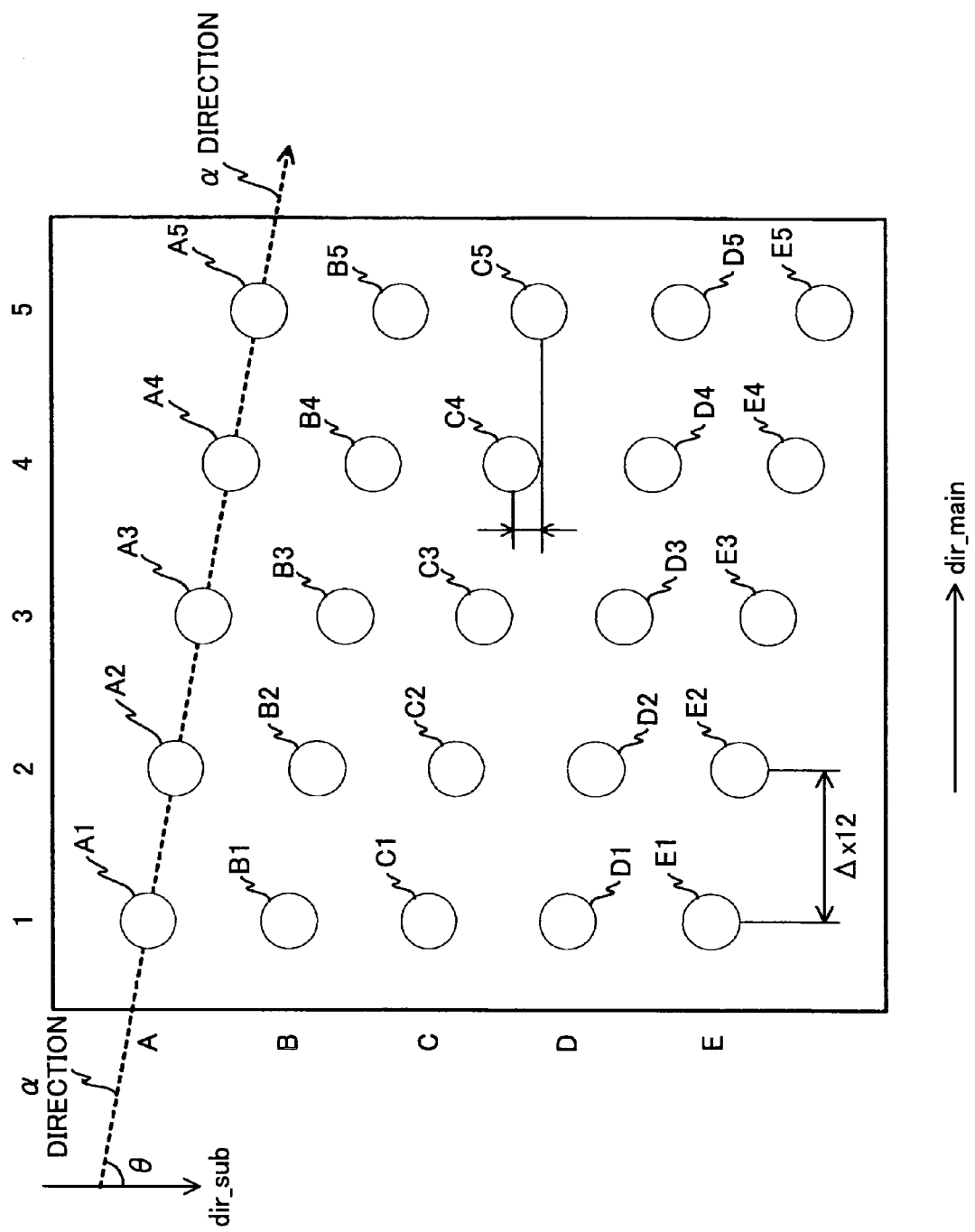
FIG. 23 is a schematic diagram of another modification example of the semiconductor laser shown in FIG. 3.

FIG. 23 is a schematic diagram of another example of a semiconductor laser. Specifically, in this semiconductor laser, plural light emitting units are arranged two-dimensionally along a dir_sub direction and a direction different from the dir_sub direction, which is tilted by an angle θ (0 degrees <θ<90 degrees) with respect to the dir_sub direction (also referred to as "α direction" in this specification, as a matter of convenience).

Figure 24:
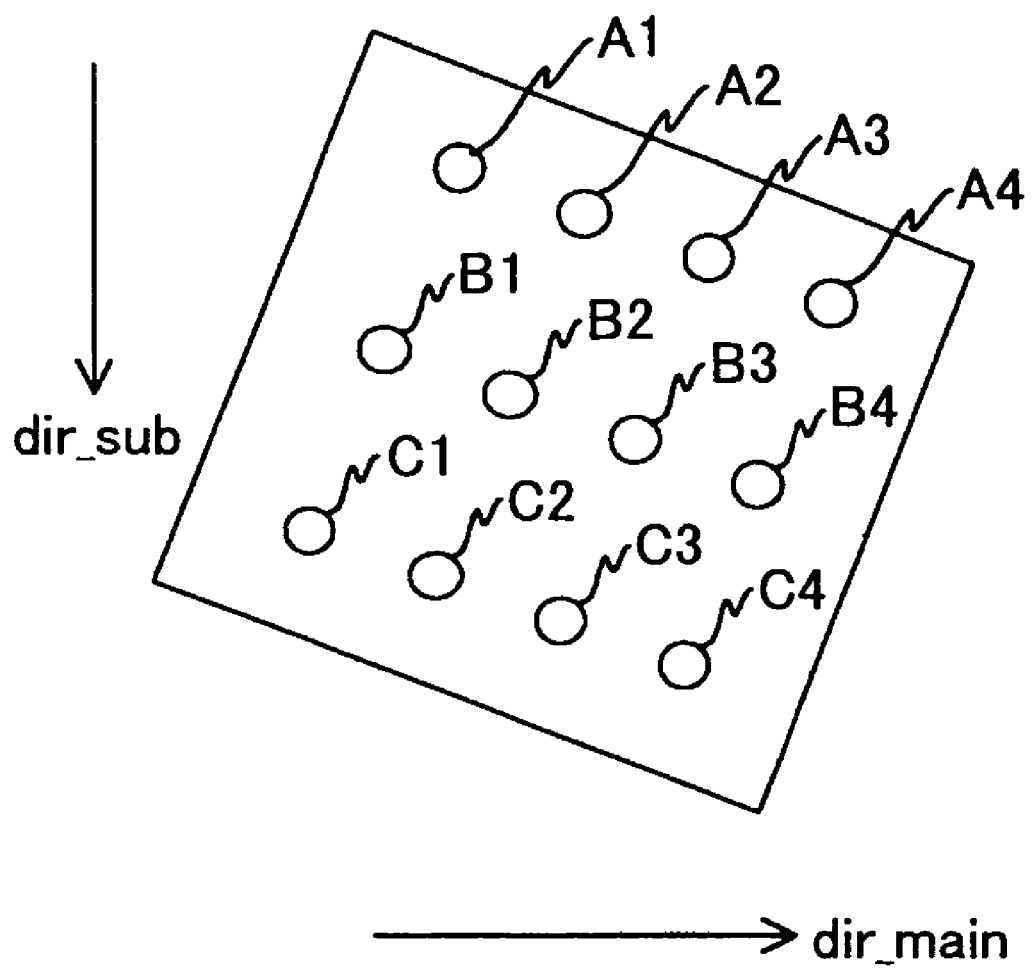
FIG. 24 is a schematic diagram of still another modification example of the semiconductor laser shown in FIG. 3.

FIG. 24 is a schematic diagram of still another example of a semiconductor laser. Specifically, in this semiconductor laser, plural light emitting units are arranged in a matrix-like manner along a dir_sub direction and a dir_main direction, and the semiconductor laser is rotated. For example, as shown in FIG. 25A, it is assumed that pixel 1 is formed by a light emitting unit A3, pixel 2 is-formed by a light emitting unit B2, pixel 3 is formed by a light emitting unit C1, and pixel 4 is formed by a light emitting unit C4. Under these conditions, an interval p12 between the pixel 1 and the pixel 2 is smaller than L (the interval between adjacent scanning lines in the sub scanning direction), an interval p23 between the pixel 2 and the pixel 3 is substantially equal to L, and an interval p34 between the pixel 3 and the pixel 4 is larger than L, in the sub scanning direction, such that the relationship of the intervals is expressed as p12<p23<p34. In order to correct the differences in the intervals p12, p23, and p34, as shown in FIG. 25B, the pixel 1 is formed by a light emitting unit A2 instead of the light emitting unit A3, and the pixel 4 is formed by a light emitting unit C3 instead of the light emitting unit C4. As a result, the intervals p12, p23, and p34 are made to be equal, so that p12=p23=p34=L is satisfied.

Figure 26:
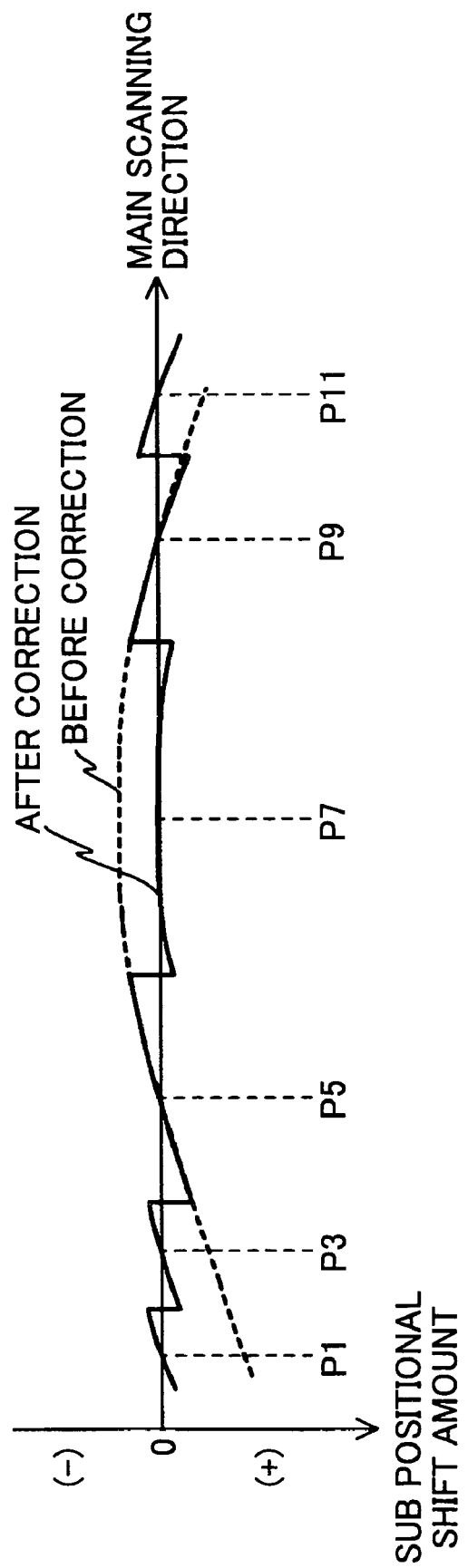
FIG. 26 describes relationships between positions in a main scanning direction and sub positional shift amounts when correcting sub scanning direction positional shifts at positions in the main scanning direction different from those of the example shown in FIG. 14.

In an embodiment of the present invention, the sub positional shift amounts at 11 positions (P1 through P11) are made to be substantially 0. However, according to the necessary or desired level of precision, light emitting units to be used as the light sources for scanning can be selected so that the sub positional shift amounts are substantially 0 at 6 positions (P1, P3, P5, P7, P9, and P11), as shown in FIG. 26. Further, the light emitting units can be selected so that the sub positional shift amounts are substantially 0 between P1 and P2, between P2 and P3, between P3 and P4, and so forth.

In an embodiment of the present invention, the pulse widths of the driving signals of each of the light emitting units selected as the light sources are controlled; however, the present invention is not limited thereto. For example, the light emitting power of each of the selected light emitting units can be controlled. In such case, the total light quantity of light emitted from the selected light emitting units is preferably controlled to match a predetermined value.

In an embodiment of the present invention, distances of the light emitting units in the dir_sub direction can correspond to positional precision of a latent image formed on the photoconductive drum 901.

In an embodiment of the present invention, when the sub positional shift amount of line 1 is greater than or equal to +L/2, an additional light emitting unit can be provided on the negative side in the dir_sub direction of the light emitting unit A. Similarly, when the sub positional shift amount of line 2 is greater than or equal to −L/2, an additional light emitting unit can be provided on the positive side-in the dir_sub direction of the light emitting unit I.

In an embodiment of the present invention, the processing circuit 815 is only one example; the circuit configuration is not limited thereto, as long as the same processes can be performed.

In an embodiment of the present invention, at least a part of the circuit of the processing circuit 815 can be mounted on the print substrate 802.

High quality color images can be obtained with a color image forming apparatus by employing an optical scanner equipped for forming color images. For example, as shown in FIGS. 27A, 27B, when image information includes image information for yellow (hereinafter, "Y image information"), image information for magenta (hereinafter, "M image information"), image information for cyan (hereinafter, "C image information"), and image information for black (hereinafter, "K image information"), trends of sub scanning direction positional shifts for all colors are made substantially equal, so that color positional shifts can be prevented.

Figure 28:
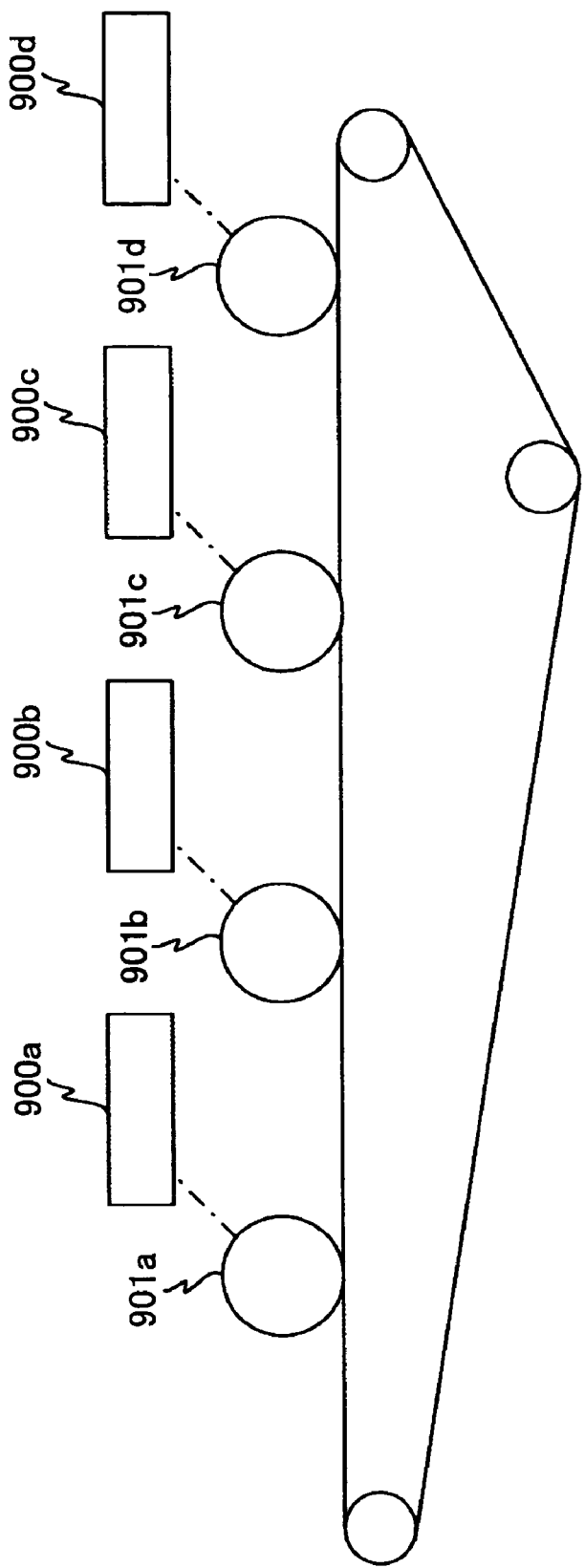
FIG. 28 is a schematic diagram of a tandem type color image forming apparatus.

The present invention can also be applied to a tandem type color image forming apparatus including photoconductive drums corresponding to different colors. An example of a tandem type color image forming apparatus is shown in FIG. 28. This image forming apparatus includes an optical scanner 900a that forms a latent image corresponding to Y image information on a photoconductive drum 901a used for Y image information, an optical scanner 900b that forms a latent image corresponding to M image information on a photoconductive drum 901b used for M image information, an optical scanner 900c that forms a latent image corresponding to C image information on a photoconductive drum 901c used for C image information, and an optical scanner 900d that forms a latent image corresponding to K image information on a photoconductive drum 901d used for K image information. Sub scanning direction positional shifts are corrected similarly to the above embodiments, so that high-quality images can be formed.

In an embodiment of the present invention, the laser printer 100 serves as the image forming apparatus; however, the present invention is not limited thereto. For example, the image forming apparatus can be a digital copier, a scanner, a facsimile machine, or a multifunction machine including the optical scanner 900. As long as the image forming apparatus includes an optical scanner in accordance with an embodiment of the present invention, high-quality images can be formed.

The present invention is not limited to the specifically disclosed embodiments, and variations and modifications may be made without departing from the scope of the present invention.

The present application is based on Japanese Priority Patent Application No. 2005-309248, filed on Oct. 25, 2005, the entire contents of which are hereby incorporated by reference.

What is claimed is:

1. An optical scanner, comprising:
   a light source unit configured to emit light;
   an optical system configured to cause the light emitted from the light source unit to scan an object so as to form an image on the object; and
   a control unit configured to control the light source unit; wherein
   the light source unit includes a plurality of light emitting units arranged in a sub scanning direction,
   the control unit controls the light source unit to emit light at different positions on the object by using either n (n: positive integer) light emitting units or n+1 light emitting units selected from among the plurality of light emitting units, according to a positional shift amount of the image in the sub scanning direction,
   the control unit further controls pulse widths of driving signals used for driving each of the selected light emitting units, and
   a total light quantity of light emitted from the selected light emitting units is maintained at a fixed level.

2. The optical scanner according to claim 1, wherein the control unit determines a correction amount for correcting the positional shift amount of the image in the sub scanning direction for each of a plurality of different positions located along a main scanning direction.

3. The optical scanner according to claim 2, wherein the correction amount is determined in units of L/m, L being a distance in the sub scanning direction between scanning lines adjacent to each other when the positional shift amount in the sub scanning direction is 0, and m being a positive integer of 2 or more.

4. The optical scanner according to claim 1, wherein n=1.

5. The optical scanner according to claim 1, wherein n=2.

6. The optical scanner according to claim 1, wherein the light emitting units are formed on a single chip.

7. An image forming apparatus comprising:
at least one object to be scanned;
the optical scanner according to claim 1 configured to scan the object with light including image information so as to form an image on the object; and
a transfer unit configured to transfer the image formed on the object to a transfer object.

8. An optical scanner, comprising:
a light source unit configured to emit light;
an optical system configured to cause the light emitted from the light source unit to scan an object so as to form an image on the object; and
a control unit configured to control the light source unit; wherein
the light source unit includes a plurality of light emitting units arranged in a sub scanning direction,
the control unit controls the light source unit to emit light at different positions on the object by using either n (n: positive integer) light emitting units or n+1 light emitting units selected from among the plurality of light emitting units, according to a positional shift amount of the image in the sub scanning direction, and
the control unit further controls light emitting power of each of the selected light emitting units
a total light quantity of light emitted from the selected light emitting units is maintained at a fixed level.

9. The optical scanner according to claim 8, wherein the control unit determines a correction amount for correcting the positional shift amount of the image in the sub scanning direction for each of a plurality of different positions located along a main scanning direction.

10. The optical scanner according to claim 9, wherein the correction amount is determined in units of L/m, L being a distance in the sub scanning direction between scanning lines adjacent to each other when the positional shift amount in the sub scanning direction is 0, and m being a positive integer of 2 or more.

11. The optical scanner according to claim 8, wherein n=1.

12. The optical scanner according to claim 8, wherein n=2.

13. The optical scanner according to claim 8, wherein the light emitting units are formed on a single chip.

14. An image forming apparatus comprising:
at least one object to be scanned;
the optical scanner according to claim 8 configured to scan the object with light including image information so as to form an image on the object; and
a transfer unit configured to transfer the image formed on the object to a transfer object.

15. In combination, a light source unit and a control unit for use with an optical system configured to cause light emitted from the light source unit to scan an object so as to form an image on the object, the combination comprising:
a light source unit configured to emit light; and
a control unit configured to control the light source unit; wherein
the light source unit includes a plurality of light emitting units arranged in a sub scanning direction,
the control unit controls the light source unit to emit light at different positions on the object by using either n (n: positive integer) light emitting units or n+1 light emitting units selected from among the plurality of light emitting units, according to a positional shift amount of the image in the sub scanning direction, and
a total light quantity of light emitted from the selected light emitting units is maintained at a fixed level.

* * * * *